US010783327B2

(12) United States Patent
Gordon

(10) Patent No.: US 10,783,327 B2
(45) Date of Patent: Sep. 22, 2020

(54) USING A PERSONAL DIGITAL ASSISTANT TO RETRIEVE AN ITEM FROM A REMOTE SOURCE

(71) Applicant: Microsoft Technology Licensing, LLC, Redmond, WA (US)

(72) Inventor: John C. Gordon, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 927 days.

(21) Appl. No.: 15/396,351

(22) Filed: Dec. 30, 2016

(65) Prior Publication Data
US 2018/0189400 A1 Jul. 5, 2018

(51) Int. Cl.
| H04L 12/28 | (2006.01) |
| G06F 40/30 | (2020.01) |
| G06F 16/9032 | (2019.01) |
| G06N 3/04 | (2006.01) |
| G06N 3/08 | (2006.01) |

(52) U.S. Cl.
CPC ........ *G06F 40/30* (2020.01); *G06F 16/90332* (2019.01); *G06N 3/0445* (2013.01); *G06N 3/0454* (2013.01); *G06N 3/08* (2013.01)

(58) Field of Classification Search
None
See application file for complete search history.

(56) References Cited

U.S. PATENT DOCUMENTS

| 5,802,312 A | 9/1998 | Lazaridis et al. |
| 5,828,893 A | 10/1998 | Wied et al. |
| 5,845,282 A | 12/1998 | Alley et al. |
| 7,328,245 B1 * | 2/2008 | Hull .................... G06Q 10/107 709/206 |

(Continued)

FOREIGN PATENT DOCUMENTS

CN 102185896 A 9/2011

OTHER PUBLICATIONS

"Managed file transfers using WebSphere MQ File Transfer Edition," available at <<http://www.ibm.com/support/knowledgecenter/SSMKHH_9.0.0/com.ibm.etools.mft.doc/bc34031_.htm>>, International Business Machines Corporation, Armonk, New York, Aug. 12, 2016, 4 pages.

(Continued)

*Primary Examiner* — Hosain T Alam
*Assistant Examiner* — Robert F May

(57) ABSTRACT

A technique is described herein for using personal digital assistant (PDA) functionality to assist a user in retrieving a content item from a source component, such as a remote user computing device. In one manner of operation, the technique involves: receiving at least one input message from the user, in which the user expresses an intent to obtain a desired content item; interpreting the input message(s) using a language understanding component of a dialog system, to provide an interpreted request; identifying zero, one or more source components, each of which provides a copy of the desired content item; retrieving the desired content item (Continued)

from at least one identified source component; and sending the desired content item over a computer network to a target component. The identifying operation involves identifying the source component(s) with reference to a hierarchically-arranged set of retrieval options.

19 Claims, 11 Drawing Sheets

(56) References Cited

U.S. PATENT DOCUMENTS

| | | | | |
|---|---|---|---|---|
| 7,711,854 | B2* | 5/2010 | Ecklund | H04L 67/2823 |
| | | | | 709/238 |
| 8,346,808 | B2* | 1/2013 | Higgins | H04L 12/1813 |
| | | | | 707/783 |
| 9,002,933 | B1 | 4/2015 | Chang et al. | |
| 9,009,219 | B2 | 4/2015 | Chawla et al. | |
| 2002/0114341 | A1* | 8/2002 | Sutherland | H04L 41/00 |
| | | | | 370/428 |
| 2007/0168439 | A1* | 7/2007 | Koch | H04L 67/306 |
| | | | | 709/206 |
| 2010/0049721 | A1 | 2/2010 | Anderson et al. | |
| 2010/0281005 | A1* | 11/2010 | Carlin | G06F 16/22 |
| | | | | 707/696 |
| 2012/0166516 | A1 | 6/2012 | Simmons et al. | |
| 2012/0290567 | A1 | 11/2012 | Nandakumar et al. | |
| 2013/0246344 | A1* | 9/2013 | Victor | G06F 16/176 |
| | | | | 707/608 |
| 2013/0254163 | A1 | 9/2013 | Savage et al. | |
| 2013/0304765 | A1* | 11/2013 | Failelson | G06F 21/6218 |
| | | | | 707/785 |
| 2015/0066479 | A1* | 3/2015 | Pasupalak | G06F 16/9535 |
| | | | | 704/9 |
| 2015/0154418 | A1 | 6/2015 | Redberg | |
| 2016/0156616 | A1 | 6/2016 | Chen et al. | |

OTHER PUBLICATIONS

"Remote Control that Enables Collaboration," available at <<https://www.manageengine.com/products/desktop-central/remote-desktop-sharing.html>>, Zoho Corporation, Pleasanton, California, retrieved on Dec. 21, 2016, 5 pages.

Cho, et al., "On the Properties of Neural Machine Translation: Encoder-Decoder," available at <<https://arxiv.org/pdf/1409.1259.pdf>>, arXiv:1409.1259v2 [cs.CL], Oct. 2014, 9 pages.

* cited by examiner

MASTER INDEX ASSOCIATED WITH USER X'S OWN DEVICES
402

USER X'S DIRECT SOURCES
DEVICE $X_1$, STATUS = ON
DEVICE $X_2$, STATUS = OFF
DEVICE $X_3$, STATUS = ON

ITEM EVENTS
EDIT EVENT: e
ACCESS EVENT: a
TRANSFER EVENT: m

| | $t_{now-25}$ | $t_{now-20}$ | $t_{now-15}$ | $t_{now-10}$ | $t_{now-5}$ | $t_{now}$ |
|---|---|---|---|---|---|---|
| ITEM ☆ | | | | $X_3, X_5$ <br> e | $X_3, X_5$ | $X_3$ <br> a |
| ITEM △ | | | $X_1$ <br> e | $X_1$ <br> a | $X_1$ | $X_1$ <br> e |
| ITEM □ | $X_3$ | $X_3$ | $X_3$ <br> m | | | |
| ⋮ | | | ↓ | | | |

TRANSFERRED TO USER DEVICE $Y_2$

---

EXPANDED MASTER INDEX ASSOCIATED WITH USER X'S INNER CIRCLE
404

---

OTHER INFORMATION HAVING A BEARING ON THE LOCATION OF ITEMS
406

FIG. 4

USING A PERSONAL DIGITAL ASSISTANT TO RETRIEVE AN ITEM FROM A REMOTE SOURCE

BACKGROUND

A user may encounter a situation in which he or she desires to access a content item using a particular user computing device, but discovers that the user computing device does not include a local copy of the content item. For example, a user may wish to access a slide presentation while on a business meeting using a laptop computing device that the user has brought to the meeting. But the user may discover that the laptop computing device does not have a copy of that item, e.g., because the user forgot to transfer the item to the laptop computing device or because a copy of the item stored on the laptop computing device is corrupted or otherwise inaccessible. A user who cannot obtain a desired content item may be prevented from performing an intended task, resulting in a range of negative consequences. And even if the user eventually obtains the desired content item, the effort to obtain it may be time-intensive, inefficient and stressful.

A user may prevent the above situation by uploading a content item to a network-accessible data store in advance of his or her trip. But the user may forget to do so, or may decline to do so for security-related reasons.

SUMMARY

A technique is described herein for using personal digital assistant (PDA) functionality to assist a user in retrieving a content item from a remote source component, such as a remote user computing device. In one manner of operation, the technique involves: receiving at least one input message from the user, in which the user expresses an intent to obtain a desired content item; interpreting the input message(s) using a language understanding component of a dialog system, to provide an interpreted request; identifying zero, one or more source components, each of which provides a copy of the desired content item; retrieving the desired content item from at least one identified source component; and sending the desired content item over a computer network to a target component (such as the user computing device with which the user is currently interacting). The identifying operation involves identifying the source component(s) with reference to a hierarchically-arranged set of retrieval options.

For instance, the hierarchically-arranged set of retrieval options can include: an option in which the technique attempts to retrieve the desired content item from a local data store; an option in which the technique attempts to retrieve the desired content item from another user computing device associated with the user (which may be in a powered-on state, a powered-off or a low-power state, etc.); an option in which the technique attempts to retrieve the desired content item from a user computing device associated with another user, and so on.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows master index information that describes content items that are available from different source components.

Figure 1:
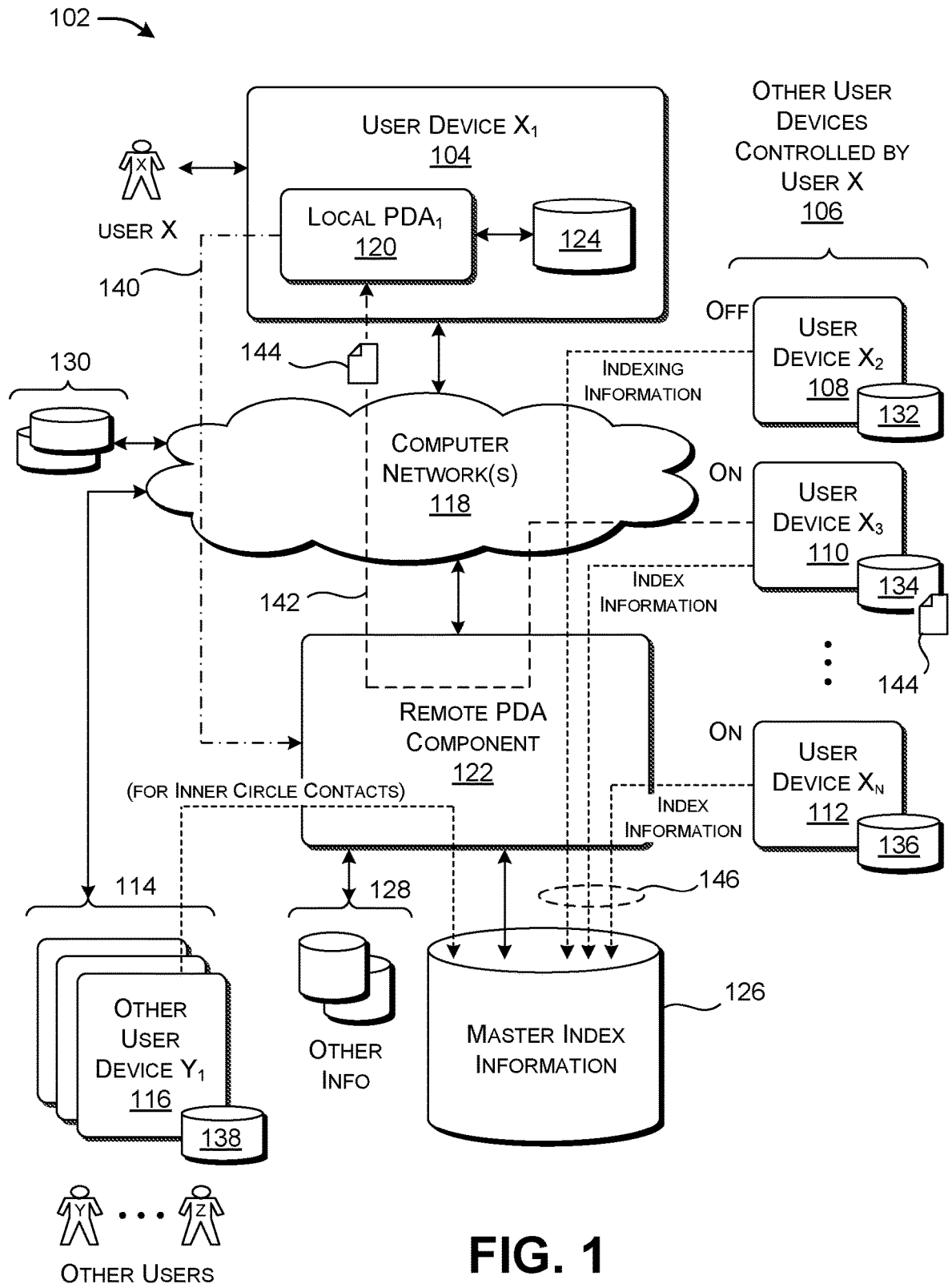
FIG. 1 shows a system in which personal digital assistant (PDA) functionality is used to assist a user in retrieving a content item from a remote source component.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for assisting a user in retrieving a content item. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or other logic hardware (e.g., FPGAs), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or other logic hardware (e.g., FPGAs), etc., or any combination thereof.

As to terminology, the phrase "configured to" encompasses various physical and tangible mechanisms for performing an identified operation. The mechanisms can be configured to perform an operation using, for instance, software running on computer equipment, or other logic hardware (e.g., FPGAs), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

FIG. 1 shows a system 102 that allows a user to access a content item from a remote source component, with respect to a local user computing device with which the user is currently interacting. For instance, assume that a user X is currently interacting with a local user computing device ($X_1$) 104. The system 102 allows the user X to access a content item from either the local user computing device 104 or any other source component.

The term "content item" encompasses any unit of information of any type or combination of types. For instance, a content item may correspond to a document, a spreadsheet, a digital picture, an audio file, a video item, etc., or any combination thereof.

The term "source component" refers to any mechanism that can supply a content item. In many cases, a source component corresponds to another user computing device. For example, the system 102 includes a collection of other user computing devices 106 that are associated with the user X, including user computing devices (108, 110, . . . , 112). For instance, the local user computing device 104 may correspond to a smartphone, while the other user computing devices 106 may include any of a game console, a computer workstation, a tablet computing device, a wearable computing device, another smartphone, etc.

More generally, any user may be associated with zero, one or more user computing devices of any type(s). In some implementations, a user may be associated with a user computing device when the user owns or otherwise controls that user device. In some implementations, the system 102 may maintain a global user ID associated with the user X. All user computing devices associated with the user X are affiliated with the same global user ID, and are identified as affiliated computing devices on this basis.

Alternatively, or in addition, a source component may correspond to a user computing device associated with another user, besides the user X. For instance, FIG. 1 shows that the user X can obtain a desired content item from other user computing devices 114, including representative user computing device ($Y_1$) 116. Each of the other user computing devices 114 is associated with another user, besides the user X, and is therefore associated with a global user ID that is different than user X's global ID.

Alternatively, or in addition, a source component can correspond to some other mechanism that can supply the desired content item. For instance, a source component may correspond to a remote data store or a virtual computing device provided by a remote computing system. The remote computing system, in turn, can be implemented by one or more server computing devices. To facilitate and simplify explanation, however, it will henceforth be assumed that the collection of candidate source components correspond to user computing devices.

At least one computer network 118 allows the local user computing device 104 to interact with any source component. The computer network 118 may correspond to a local area network, a wide area network (e.g., the Internet), one or more point-to-point links, etc., or any combination thereof.

The system 102 uses personal digital assistant (PDA) functionality to assist each user in performing various tasks using a conversational interface. Such tasks include, for instance, scheduling a meeting, purchasing an airline ticket, performing a search, creating a memo, etc. As described herein, the system 102 expands traditional PDA functionality to perform a new task of assisting each user in obtaining a desired content item from one or more source components.

More specifically, this description emphasizes the representative scenario in which an instance of PDA functionality provides a personalized service to the particular user X. Although not shown, other instances of PDA functionality can provide personalized services to other respective users. The PDA functionality provides a personalized service, in part, based on knowledge gained through past interactions with a particular user, and through privileged access to other applications associated with the user (such as a calendar application with which the user interacts).

The PDA functionality associated with the user X is distributed among various components in the system 102 of FIG. 1. For example, the local user computing device 104 includes a local PDA component 120. Although not specifically shown, each of the other user computing devices 106 associated with the user X includes a local PDA component. All such local manifestations of the PDA functionality that provide a service to the user X are associated with the user X's global user ID.

The local PDA component 120 works in conjunction with a counterpart remote PDA component 122. One or more remote computing systems implement the remote PDA component 122. More specifically, the local PDA component 120 can be said to work in conjunction with a user-specific instance of the remote PDA component 122 that is associated with the user X's global ID. Another local PDA component (such as the local user computing device 116) associated with another user (e.g., user Y) works in conjunction with another user-specific instance of the remote PDA component 122, associated with that other user's global ID. The remote PDA component instances may draw upon common processing resources, such as common language understanding functionality and common dialog management functionality described below. To facilitate explanation, however, the remote PDA component 122 will be mainly described below in the context of its role in providing a service to the specific user X.

Overall, the system 102 allocates certain PDA functions to each local PDA component and other PDA functions to its counterpart remote PDA component instance. In one illustrative and non-limiting implementation, for instance, assume that the user X is currently interacting with the user computing device 104 in an offline mode, that is, without connection to the network 118. Further assume that the user X enters an input message which expresses an intent to retrieve a particular file, e.g., by stating, "Retrieve June Sales Report document." In that circumstance, the local PDA component 120 can include logic that performs limited analysis of the input message to generate an interpreted request, e.g., by detecting a triggering keyword (e.g., "Retrieve") and by extracting what it initially assumes is the name of the content item to be retrieved (e.g., "June Sales Report"). The local PDA component 120 can then conduct a syntax-literal search for the identified content item within a local data store 124. If the local PDA component 120 finds a file that includes the string "June Sales Report" in its title, it may report its findings to the user X, or automatically retrieve that file.

Alternatively, assume that the user computing device 104 is currently connected to the computer network 118. In that circumstance, the local PDA component 120 can transfer the user X's input message to the remote PDA component 122. Thereupon, the remote PDA component 122 can use a language understanding component (described below) that performs semantic analysis on the user's input message, to generate an interpreted request. The remote PDA component 122 can perform this semantic analysis using one or more machine-trained statistical models and/or one or more rule-based engines. The remote PDA component 122 can then consult master index information (provided in a data store 126) to determine zero, one or more source components that may have a copy of the desired content item. The remote PDA component 122 can identify the source component(s) that may provide the desired content item from a collection of candidate source components, including the user computing devices 106 associated with the user X and (potentially) the user computing devices 114 associated with other users, etc. In performing its search, the remote PDA component 122 can also consult one or more other data stores 128 that provide other information. For example, one such data store may identify individuals who are contacts of the user X. That data store can also identify a subset of the contacts that have a privileged "inner circle" relationship with the user X, to be described below.

Assume that the remote PDA component 122 identifies at least one source component that has a copy of the desired content item. The remote PDA component 122 can then transfer the desired content item from an identified source component to a target component, e.g., in automatic fashion or in response to an instruction from the user. The source component refers to the user computing device or other mechanism from which the desired content item is obtained. The target component refers to the user computing device or other mechanism to which the desired content item is being sent.

For instance, in many cases, the target component corresponds to the same user computing device with which the user submits the input message(s), e.g., corresponding to the local computing device 104 in the scenario of FIG. 1. But in other cases, a target computing device may correspond to some mechanism other than the local user computing device 104. For example, the user X may specify (in his or her input message) that the desired content item is to be sent to another user computing device controlled by the user X. Or the user X may specify that that the desired content item is to be sent to a remote data store 130. In that case, the remote PDA component 122 can provide the user X with a link to the desired content item in the remote data store 130, which enables the user X to later access the desired content item.

In one implementation, the system 102 can conduct its search for an available copy of a desired content item in staged manner, based on a hierarchically-arranged set of retrieval options. For instance, the local PDA component 120 and/or the remote PDA component 122 can first attempt to find the desired content item in the local data store 124 of the user computing device 104. If the desired content item is not stored in the local data store 124, the remote PDA component 122 can then determine whether any of the user computing devices 106 (which are also associated with the user X) store the desired content item in their respective data stores (e.g., in the data stores 132, 134, . . . , 136). If the desired content item cannot be obtained through any of the user computing devices 106, then the remote PDA component 122 can determine whether the content item can be obtained from a source component associated with another user (besides the user X), such as from a data store 138 associated with the user computing device 116. The system 102 implements this staggered search procedure by consulting escalation logic, which is embodied in the PDA functionality (e.g., in the local PDA component 120 and/or the remote PDA component 122).

The PDA functionality can execute the staggered retrieval operation as part of a single retrieval operation that produces a single output result. The PDA functionality can then send that single output result to the user X. Alternatively, the PDA functionality can perform part of the staggered retrieval operation to produce a partial output result, and then send that partial output result to the user. The PDA functionality can then invite the user to initiate an additional phase of the staggered search operation. For example, upon failing to find the desired content item from one of the user X's own user computing devices 106, the PDA functionality can send a message to the user X. That message may ask the user X whether the search should be extended to user computing devices associated with other users with whom user X has a close "inner circle" relation.

Note that the above-described allocation of operations between the local PDA component 120 and the remote PDA component 122 is set forth in the spirit of illustration, not limitation. Other implementations of the system 102 can use a different allocation of operations. For example, in another implementation, the local PDA component 120 can also perform semantic analysis on the input messages provided by the user X. Alternatively, or in addition, in another implementation, the local PDA component 120 can perform any of the phases of the staggered search operation that were described above as being performed by the remote PDA component 122 to perform these operations.

FIG. 1 annotates the components of the system 102 with arrows that summarize one flow of information within the system 102. In an operation labeled 140, the local PDA component 120 can send one or more input messages to the remote PDA component 122, which convey the user X's intention to find a particular content item. In a second operation (not labeled), the remote PDA component 122 can perform one or more stages of a staggered search operation to identify at least one source component that includes a copy of the desired content item. In a third operation (not labeled), the remote PDA component 122 can optionally send its output results to the user X. Assume that the output results include metadata that indicates that the user computing device 110 stores a copy of the desired content item in its local data store 134, potentially among other user computing devices which also store a copy of the desired content item. In a fourth operation (not labeled), the user can interact with the local PDA component 120 to select a copy of the desired content item. Assume that the user selects the copy that is stored by the user computing device 110. In a fifth operation, the remote PDA component 122 receives a message that expresses the user's selection and forwards it to the user computing device 110. In a sixth operation labeled 142, the remote PDA component 122 forwards the desired content item 144 from the local data store 134 of the user computing device 110 to the local user computing device 104. Other implementations of the system 102 can modify the above-described sequence of operations in any manner.

The remote PDA component 122 can receive information describing the items stored by the local user computing devices in different ways. In operation 146, for instance, the user computing devices 106 can send index information to the remote PDA component 122. The remote PDA component 122 can assemble the separate instances of the index information into the master index information, for storage in the data store 126. As will be explained below with reference to FIG. 2, the system 102 can receive index information from source components in an offline mode and/or in an on-demand online mode, or in a combination thereof. Further note that, while FIG. 1 shows that the remote PDA component 122 is the agent in charge of compiling the master index information, in other implementations, the local PDA component 120 can also play a role in this operation.

In some implementations, each local computing device can interact with the remote PDA component 122 via outgoing communication messages. For example, the local PDA component 120 can initiate a search operation by sending the user input message(s) to the remote PDA component 122. Each user computing device can also periodically perform a polling operation in which it asks the remote PDA component 122 whether it has any work for it to perform. If the polling operation returns an affirmative result, a local computing device will perform whatever work is assigned to it, e.g., by performing an indexing operation. The local computing device then sends the results of that work to the remote PDA component 122. The results of the work may correspond, for instance, to an individual instance of index information. This manner of operation allows a local computing device to overcome a restriction on incoming messages that may be enforced by its firewall functionality. This manner of operation also reduces the risk that a malicious actor can obtain information from a local computing device by falsely acting as the remote PDA component 122.

In one implementation, each instance of local PDA functionality (such as a local PDA component running on a local user computing device) that transmits information over the computer network 118 encrypts that information prior to transmission. And each instance of PDA functionality that receives information over the computer network 118 can perform a complementary decryption operation. The encryption mechanism provided by the system 102 can use conventional public key cryptography to perform this task, e.g., through the use of complementary public and private encryption keys associated with each user.

Finally, the system 102 of FIG. 1 has been described in the principal context in which a user interacts with the PDA functionality to obtain a copy of a content item that may be stored at a remote location, such as one of the user's remote computing devices 106. But the system 102 can also perform other operations that affect a specified content item. For instance, as mentioned above, a user can interact with the PDA functionality to move a specified content item to a designated location. In other cases, a user may interact with the PDA functionality to delete a specified content item, encrypt a specified content item, change a status of a specified content item (such as by labeling it as "read only"), and so on.

Figure 2:
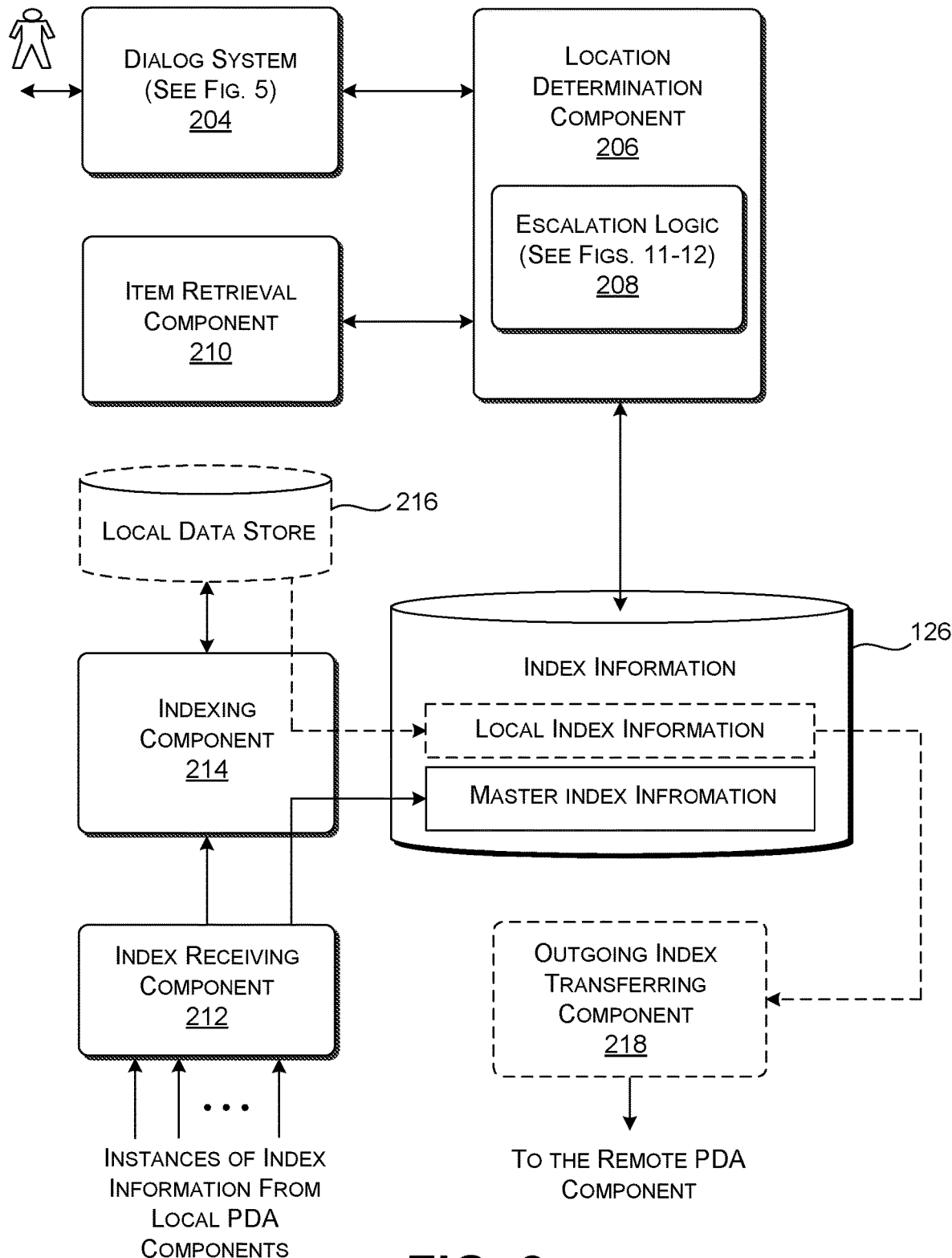
FIG. 2 shows illustrative PDA functionality for use in the system of FIG. 1.

FIG. 2 shows one implementation of PDA functionality 202. The remote PDA component 122 can implement a first instantiation of the PDA functionality 202, while the local PDA component 120 can implement a second instantiation of the PDA functionality 202. The PDA functionality 202 will first be explained in the context of its implementation by the remote PDA component 122. The PDA functionality 202 will then be described in the context of its implementation by the local PDA component 120.

Figure 5:
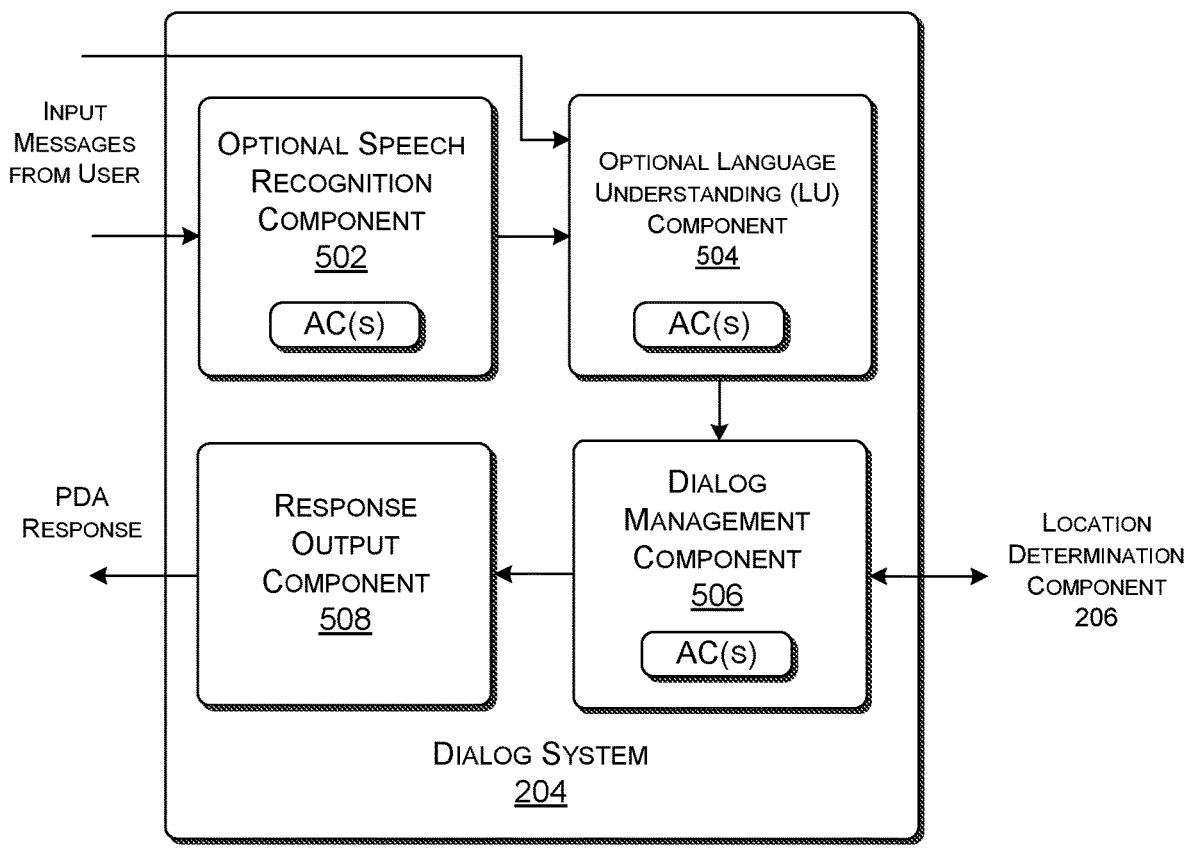
FIG. 5 shows one implementation of a dialog system for use in the PDA functionality of FIG. 2.

A dialog system 204 provides a conversational interface by which a user may interact with the PDA functionality 202. The dialog system 204 does this by receiving one or more input messages from a user, and interpreting the input messages to provide an interpreted request. The input message(s) express the user's intent to retrieve a desired content item. The dialog system 204 can also generate at least one response to the user's input message(s) and send that response to the user. FIG. 5, described below, shows one implementation of the dialog system 204.

Figure 11:
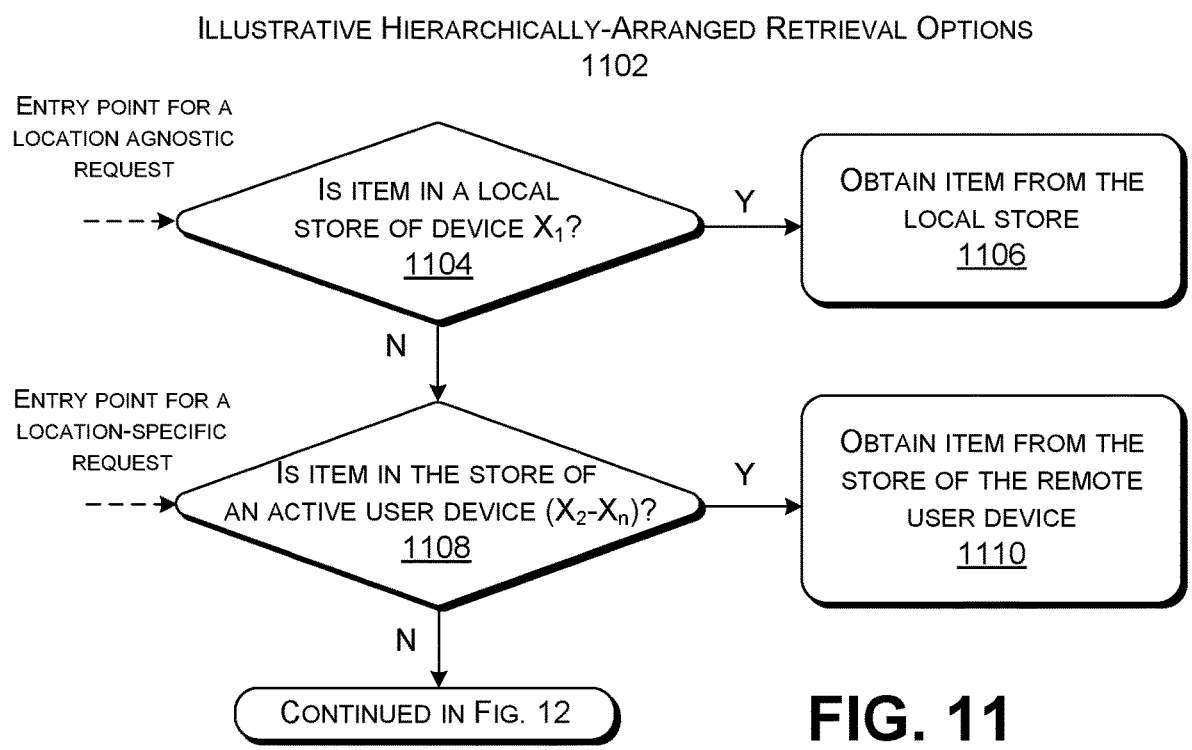
FIGS. 11 and 12 together show a process that represents a staggered search, in which the system explores a set of hierarchically-arranged retrieval options.
Figure 12:
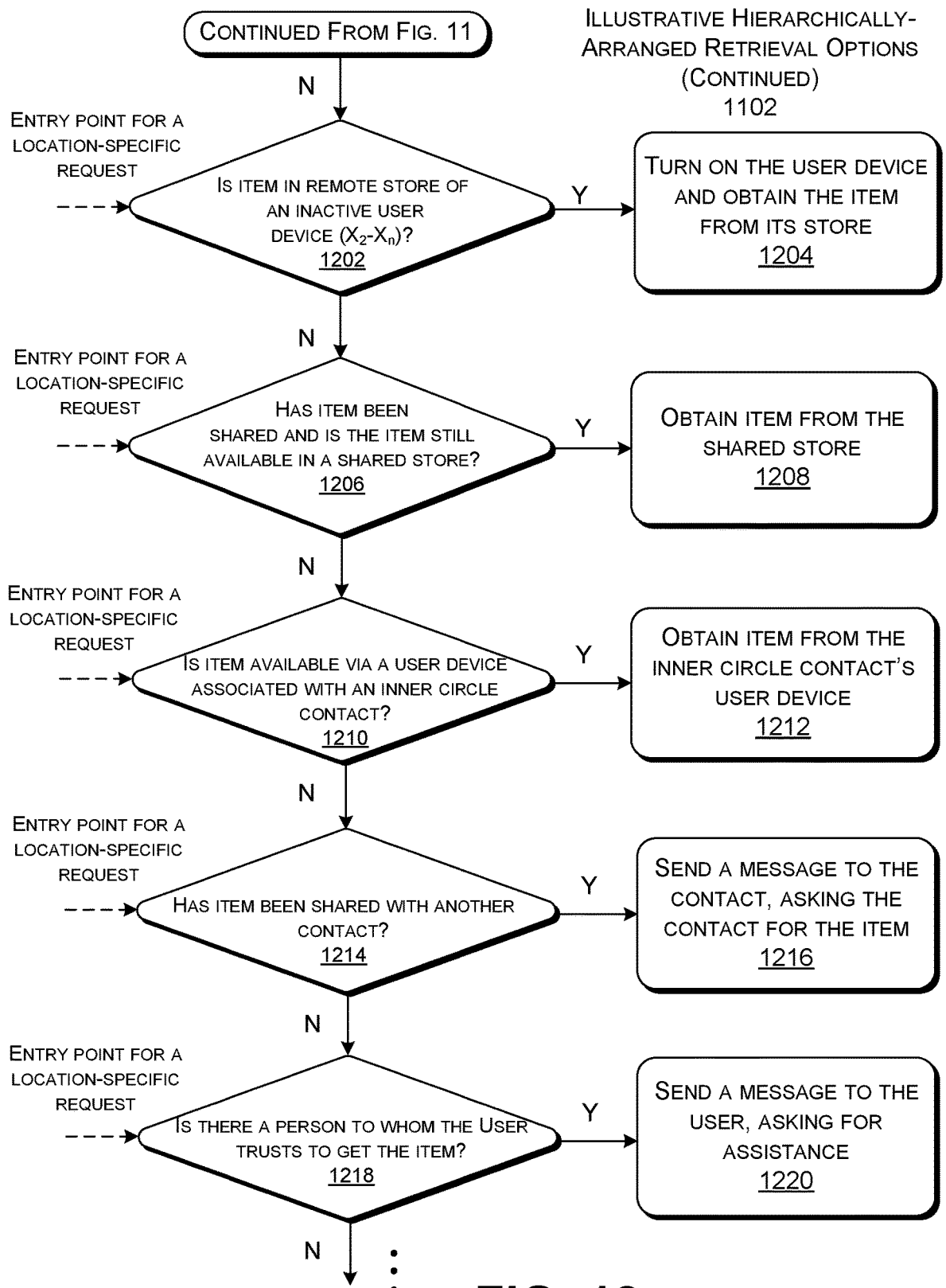

A location determination component 206 identifies at least one source component that can provide a copy of the desired content item. In one implementation, the location determination component 206 performs its search for a copy of the desired content item using a staggered approach, as controlled by escalation logic 208. FIGS. 11 and 12, described below, show one implementation of a process that carries out a staggered search in accordance with the escalation logic 208. The location determination component 206 can perform its search using master index information provided in the data store 126.

An item retrieval component 210 can retrieve a copy of the desired content item from one of the identified source components, and then deliver the desired content item to a target component. As explained above, the target component may correspond the user computing device 104 through which the user provides the input message(s), and/or some other user computing device or mechanism.

In the context in which the PDA functionality 202 is implemented by the remote PDA component 122, an index receiving component 212 can receive instances of index information from other user computing devices. For instance, with reference to FIG. 1, the index receiving component 212 can receive instances of index information from at least the user computing devices 106. Each user computing device provides an instance of index information which describes the content items stored its local data store. For instance, the user computing device 110 provides an instance of index information that describes content items stored in its local data store 134. In certain circumstances, described below, user computing devices associated with other users can also perform respective indexing operations and provide instances of index information to the index receiving component 212. For instance, the user computing device 116 controlled by another user (besides user X) can perform an indexing operation to identify the content items provided in its local data store 138, and then send an instance of index information to the index receiving component 212.

The system 102 of FIG. 1 can operate in at least two different modes to collect instances of index information. In a first offline mode, each local computing device performs an indexing operating to identify the content items stored in its local data store on a periodic basis (e.g., at the end of every day) and/or on an event-driven basis (e.g., in response to a change in the content items being stored in its local data store). Each user computing device can then transfer its resultant index information to the remote PDA component 122 via the index receiving component 212.

In an on-demand mode, upon receiving an input message from a user, the remote PDA component 122 can ask each user device to perform a local search operation, to provide an instance of index information. In this case, however, the index information is targeted because it indicates whether or not a specific source component stores a desired content item, rather than generally describing all of the content items stored by that source component In yet another case, the remote PDA component 122 can receive instances of index information from some source components in an offline manner, and receive instances of index information from other source components in an on-demand manner. For example, the remote PDA component 122 can perform an on-demand search of a user computing device's data store if that user computing device is currently powered on; otherwise, the remote PDA component 122 can rely on index information that has been previously forwarded by the user computing device to the remote PDA component 122 in the offline mode.

An indexing component 214 can combine separate instances of index information into a single record, and then update the master index information in the data store 126 based thereon. In some cases, the master index information provides a comprehensive record of the contents of all (or some) of the source components in the system. In other cases, the master index information provides more targeted insight into whether or not the source components provide a copy of a particular desired content item. FIG. 4, described below, sets forth one data structure for storing the master index information.

Now consider the case in which at least portions of the PDA functionality 202 are implemented by a source component, such as the user computing device 110 of FIG. 1 that supplies the desired content item 144. In that context, the indexing component 214 performs an indexing operation in an offline manner to determine the entire contents of a local data store 216 (corresponding to data store 134 shown in FIG. 1). Or the indexing component 214 performs a more targeted indexing operation in an online on-demand manner to determine whether the local data store 216 stores a copy of a particular content item. In either case, this operation yields an instance of local index information. The indexing component 214 then stores the local index information in the data store 126.

An outgoing index transferring component 218 sends the instance of local index information to the remote PDA component 122. For instance, in the offline mode, the outgoing index transferring component 218 sends the local index information on a periodic basis and/or on an event-driven basis. In the online mode, the outgoing index transferring component 218 sends the local index information when requested by the remote PDA component 122.

A local instantiation of the PDA functionality 202 can also implement any aspect of the above-described operations performed by the dialog system 204, the location determination component 206, and/or the item retrieval component. For instance, the local PDA component 120 can implement at least parts of the conversational interface provided by the dialog system 204. The local PDA component 120 can also implement at least parts of a search procedure described by the escalation logic 208, and so on.

Figure 3:
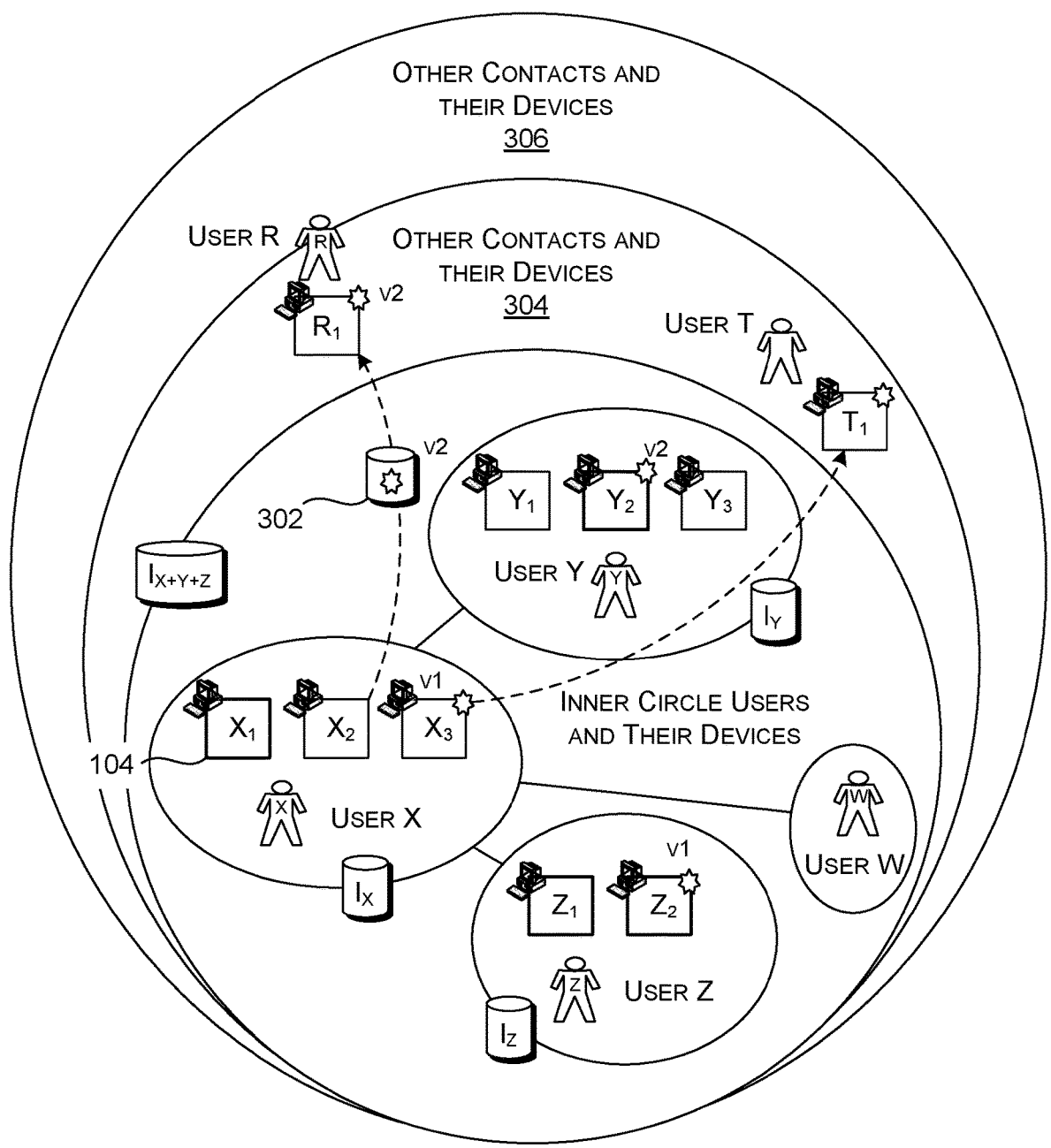
FIG. 3 represents different source components from which a user may obtain a desired content item, and the relationship between the source components and the user.

FIG. 3 represents a universe of source components from which a user (e.g., user X) may obtain a desired source item. Again assume that the user X interacts with the system 102 via a local user computing device 104. Further assume that the user X expresses an intention to retrieve a particular desired content item that is denoted in FIG. 2 with a star symbol.

As a first retrieval option, the location determination component 206 (of FIG. 2) can determine whether the local user computing device 104 stores the desired content item. In this case, assume that the local user computing device 104 does not store the desired content item in its local data store 124. As another retrieval option, the location determination component 206 can determine whether one or more other user computing devices associated with user X can supply the desired content item. In this case, assume that a local computing device $X_3$ stores a copy of the desired content item, corresponding to a first version (v1). A subset of the user X's own user computing device may be operating in a powered-on state, and another subset of the user X's own user computing devices may be operating in a powered-off or low-power (e.g., sleep) state. The data store 126 can store master index information that describes the union of all of the content items stored in the user X's own user computing devices.

As another retrieval option, the location determination component 206 can retrieve a content item from a user computing device associated with another user with whom the user X has a close "inner circle" relationship. The inner circle relationship entitles the user X to discover the content items that are stored on these other user computing devices in the same manner as user X's own user computing devices. Here, assume that user X has an inner circle relationship with users W, Y, and Z. For this option, the data store 126 can store master index information that describes the union of all of the content items in the user X's own user computing devices as well the content items in the inner circle user computing devices.

In the merely illustrative case of FIG. 3, assume that user Z has a user computing device $Z_2$ that stores a copy of the desired content item, associated with a first version (v1) of the content item, and that user Y has a computing device $Y_2$ that stores another copy of the desired content item, associated with a second version (v2) of the content item. Assume that user W has an inner circle relationship with user X, but does not control any user computing devices.

As another option, the location determination component 206 can retrieve a content item from a shared data store 302. Assume that the shared data store 302 stores a copy of the desired content item in response to the user X sharing a copy of that content item with a user R, or vice versa.

As another retrieval option, the location determination component 206 can invite a user belonging to another group of contacts 304 to provide the desired content item. For example, the master index information can preserve information indicating that the user X has previously sent the desired content item to another user (i.e., a user T) within this group of contacts 304, e.g., by Email message or by some other communication channel. Or the master index information may more generally preserve evidence that the user T may have access to the desired content item, e.g., in response to calendar-derived knowledge that the user X and the user T attended the same conference or meeting in which the desired content item was distributed to audience members. In response to this finding, the location determination component 206 can first determine whether a communication-related data store still stores the desired content item as a result of the transfer of the content item from user X to user T. For instance, the location determination component 206 can determine whether a copy of the desired content item can be found in the data store maintained by an Email server, e.g., in the sent folder of user X.

Assume that the desired content item can no longer be obtained via an Email server or the like. If so, the location determination component 206 can send a targeted message to a local personal digital assistant (PDA) component associated with the user T. PDA functionality associated with the user T can then deliver the targeted message to user T. The targeted message invites the user T to provide the desired content item. In this circumstance, note that the user X has no permission to independently discover the contents of the user computing devices controlled by user T. As such, the master index information that is accessible to the user X does not enumerate the content items stored by user T's user computing devices. The master index information only indicates that the user X has previously sent the desired content item to the user T.

Assume that the user T receives the targeted message through its own local PDA functionality. Further assume that the user T declines to provide a copy of the desired content item to the user X. In response, the location determination component 206 (of user X's PDA functionality 202) can formulate a message to user X that generically indicates that the desired content item could not be found, without specifically indicating the response by the user T. This user experience is advantageous because it helps protect the privacy of the user T.

As yet another retrieval option, the location determination component 206 can send a directed message to a user in a third group of contacts 306. That message may invite the recipient user (i.e., recipient user W) for assistance in obtaining the desired content item from one of the user X's own user computing devices. The third group of contacts may include some of the user X's inner circle contacts, but is not limited thereto. Assume here, for instance, that this retrieval operation involves interaction with the user W, who is an inner circle contact of user X. The message sent to the user W (via user W's PDA functionality) may ask the user W to turn on one of the user X's computing devices, or otherwise provide some help in extracting a copy of the desired item from one of user X's computing devices. This option may be appropriate in the case in which user X and user W live in the same house or share the same working space. More generally, the user X can specifically choose the users in the third group or contacts 306 based on any user-specific considerations. The PDF functionality 202 can choose a user within this group of contacts 306 based on any consideration(s), such as an indication that the user W is within close proximity to one of user X's computing device (e.g., which may be determined by any position-determining mechanism, such as a GPS mechanism, a Near Field Communication mechanism, etc.). The user X can also add metadata which assigns a priority level to each user in the group of contacts 306, reflecting the desirability of choosing this user as a person from whom to ask assistance.

Note that the two last-mentioned retrieval options involve scenarios in which the PDA functionality associated with user X interacts with the PDA functionality associated with some other user (e.g., user T or user W). This behavior constitutes an example of cross-PDA interaction. Once again, the user T or user W can configure their instances of PDA functionality to fully control this kind of cross-PDA interaction. For instance, a user may completely disable the ability of foreign PDA agents to send it messages. Or a user may restrict the people who are authorized to send cross-PDA messages.

More generally note that the above-described retrieval options are described by way of example, not limitation. Other implementations can include additional retrieval options to those described above, and/or can omit one or more options described above. For example, in another operation, one or more instances of PDA functionality can preserve information which indicates that a content item was transferred along a chain of users. For instance, the information may indicate that the user X transferred the content item to user R, who then transferred it to user T. In this case, the PDA functionality 202 can optionally send a message to user T asking him or her to return a copy of the content item to user X.

Further, other implementations can rank the retrieval options described above in a different order compared to that described above. For example, in another implementation, the location determination component 206 can attempt to retrieve a desired content item from the shared data store 302 before it seeks to obtain the content item from another user computing device owned by the user X or any other user.

In some implementations, the escalation logic 208 implements one or more of the location determination operations described above by following one or more stored rules. The rules define if a location determination operation is to be performed, and, if so, the order in which the location determination operation is to be performed with respect to other location determination operations, given a current input condition. The input condition describes, in part, the level of generality in which the user expresses his or her intention to retrieve a desired content item. Alternatively, or in addition, the escalation logic 208 makes the above decisions based on a machine-trained statistical model. In either a rule-based or machine-learned implementation, the escalation logic 208 can also take account for the explicit and learned preferences of each individual user. For example, a particular user may prefer to retrieve a content item from one inner circle contact over another inner circle contact; the escalation logic 208 will honor this preference upon detecting a pattern in the user's conduct which evinces the user's preference.

FIG. 4 shows one data structure that describes master index information provided in the data store 126. At the outset, it should be noted that different implementations can store different sets of information items, and different implementations can organize these information items in different respective ways; FIG. 4 shows just one possible selection and organization of information items.

The master index information includes a first section 402 that stores information regarding the content items provided by the user's own user computing devices. In one case, that section 402 can represent the content items stored by the user computing devices at a present time ($t_{now}$) using any metadata. For instance, the metadata can describe the file names of the content items, the devices on which the content items are stored, the versions of the content items, and so on. The metadata can also indicate certain events that have occurred that have affected each local copy of a content item. For instance, the metadata can indicate when a content item was accessed, when the content item was modified, and when the content item was transferred to another user computing device or other target destination.

Optionally, the section 402 can also provide the above-described information with respect to various times over a prescribed window of past time. For instance, the section 402 can provide history information that describes the state of the master index information at a time $t_{now-5}$ (e.g., corresponding to five minutes prior to $t_{now}$), at a time $t_{now-10}$ (e.g., corresponding to ten minutes prior to $t_{now}$), and so on. The historical information may provide evidence as to where a desired content item that is no longer present on a user computing device may be found. For instance, the section 402 indicates that one version of a content item was transferred in the past from a user computing device $X_3$ (controlled by the user X) to a user computing device $Y_2$ (controlled by the user Y). Armed with this knowledge, the location determination component 206 can attempt to retrieve the content item from user Y's computing device.

The master index information can optionally also include another section 404 which provides the kind of information described above, but with respect to the entire universe of user computing devices (or other source components) associated with user X's inner circle, rather than just user X's own computing devices.

The master index information can optionally include another section 406 which stores any other environment-specific information that may have a bearing on the location of a desired content item.

FIG. 5 shows one implementation of the dialog system 204 that can be used in the PDA functionality 202 of FIG. 2. In one case, the remote PDA component 122 implements the entirety of the dialog system 204. In another case, each local PDA component (such as the local PDA component 120) implements at least part of the dialog system 204. Overall, the dialog system 204 provides an interface by which a user can interact with the PDA functionality 202 in a conversational manner.

In one implementation, the dialog system 204 includes four principal parts. As a first part, an optional speech recognition component 502 receives an input signal from one or more audio input devices (not shown). In some cases, for instance, that input signal expresses a user's input message as an audio waveform signal, captured by one or more microphones. The speech recognition component 502 converts the input signal into recognized speech information. The speech recognition component 502 can use any analysis component(s) (labeled in FIG. 5 as AC(s)) to perform this task, such as a deep-learning neural network of any type.

In an alternative case, the dialog system 204 receives the user's input messages in text form, which, for instance, the user may type into an input interface. In this case, the dialog system 204 omits use of the speech recognition component 502 in its processing of the input messages.

In a second part, a language understanding (LU) component 504 optionally uses one or more analysis components (AC(s)) to interpret the user's input messages. Additional information regarding one implementation of the LU component 504 is set forth below with respect to FIG. 6. The LU component 504 outputs an interpreted request.

In a third part, a dialog management component 506 uses one or more analysis components (AC(s)) to track the state of the ongoing conversation and to map the interpreted request into a PDA utterance. The PDA utterance represents the dialog system's response to the user's input message(s). Additional information regarding one implementation of the dialog management component 506 is set forth below with respect to FIG. 7.

In a fourth part, a response output component 508 converts the PDA utterance generated by the dialog management component 1608 into an appropriate output form, and then sends the converted PDA utterance to the user. For example, the response output component 508 can use a text-to-speech synthesizer to convert a text-based representation of the PDA utterance into audio form.

Figure 6:
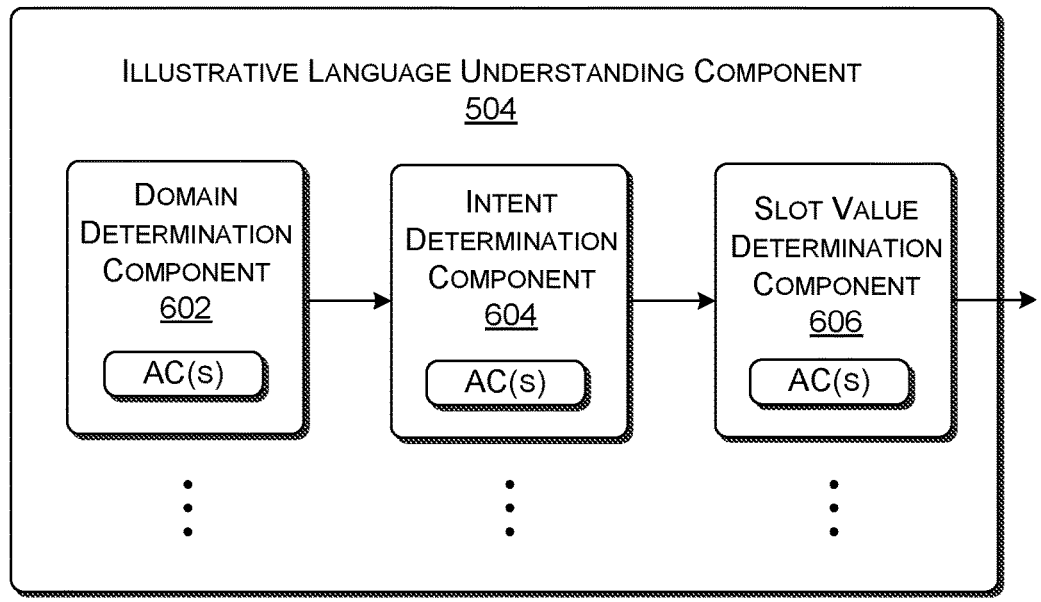
FIG. 6 shows one implementation of a language understanding component, for use in the dialog system of FIG. 5.

FIG. 6 shows one implementation of the language understanding (LU) component 504 of FIG. 5. The LU component 504 includes at least one domain determination component 602, at least one intent determination component 604, and at least one slot value determination component 606.

More specifically, the domain determination component 602 determines the most probable domain associated with a user's input message. A domain pertains to the general theme to which an input message pertains, which may correspond to a set of tasks handled by a particular application, or a subset of those tasks. For example, the input command "find Mission Impossible" pertains to a media search domain. The input command "give me a copy of PresentationSalesReport.doc" pertains to an item retrieval domain.

The intent determination component 604 determines an intent associated with a user's input message. An intent corresponds to an objective that a user likely wishes to accomplish by submitting an input message. For example, a user who submits the command "find Mission Impossible" intends to find a particular movie having the name of "Mission Impossible." A user who submits the command "buy Mission Impossible" intends to purchase the movie "Mission Impossible." In the item retrieval domain, a user who submits the command "give me a copy of PresentationSalesReport.doc" is interested in obtaining a copy of a content item. A user who submits the command "Delete a copy of PresentationSalesReport.doc from my home desktop" intends to delete a content item from a particular source component (the user's home computing device), and so on.

The slot value determination component 606 determines slot values in the user's input message(s). The slot values correspond to information items that an application needs to perform a requested task, upon interpretation of the user's input message. For example, the command "find Jack Nicolson movies in the comedy genre" includes a slot value "Jack Nicolson" that identifies an actor having the name of "Jack Nicolson," and a slot value "comedy," corresponding to a requested genre of movies. In the item retrieval domain, the command, "send a copy of PresentationSalesReport.doc to my laptop desktop" includes a slot value "PresentationSalesReport.doc" that identifies a desired content item, a slot value "send" that identifies an action to take with respect to the content item, and a slot value "laptop desktop" that describes a destination to which the content item is to be sent.

Any of the domain determination component 602, intent determination component 604, and slot value determination component 606 can use any technology to perform their respective functions. For example, any of these components (602, 604, 606) can use one or more machine-trained statistical models. To cite merely one illustrative and non-limiting case, the domain determination component 602 may correspond to a machine-trained classification model, such as a linear model, a deep-learning neural network model, a support vector machine model, and so on. The intent determination component 604 can likewise correspond to any of these kinds of models.

The slot value determination component 606 may correspond to a machine-trained Conditional Random Fields (CRF) model. In this approach, a CRF model provides the most probable slot sequence defined by:

$$\hat{Y} = \underset{Y}{\mathrm{argmax}} p(Y \mid X).$$

In this equation, the term X refers to a sequence of tokens in a detected linguistic item $(x_1, x_2, \ldots, x_T)$ and Y refers to a sequence of tags $(y_1, y_2, \ldots, y_T)$ assigned to the tokens, where the tags are selected from a set C of possible tags. The tags correspond to slot variables, such as, in the item retrieval domain, the tags, "content item name," "source location," "target location," etc. In the above example, the CRF model would determine that the term "PresentationSalesReport.doc" corresponds to a name of a content item, having the particular value "PresentationSalesReport.doc."

Alternatively, or in addition, any of the domain determination component 602, the intent determination component 604, and/or the slot value determination component 606 can use a rule application engine to perform its respective analysis. For example, any of these components (602, 604, 606) can apply rules which maps certain keywords in an input message into appropriate classification results. For instance, the intent determination component 604 can apply a rule that indicates that any input message that matches the template "give me a copy of <x>" refers to an intent to obtain a copy of a specified content item, where that content item is identified by the value of variable x.

In some implementations, the LU component 504 can use a single domain determination component, a single intent determination component, and a single slot value determination component to interpret all input messages provided by a user. In other cases, the LU component 504 includes plural sets of these three components associated with respective domains. For example, the LU component 504 includes a first set of components for interpreting input messages pertaining to the media domain, a second set of components for interpreting input messages pertaining to the item retrieval domain, and so on.

Figure 7:
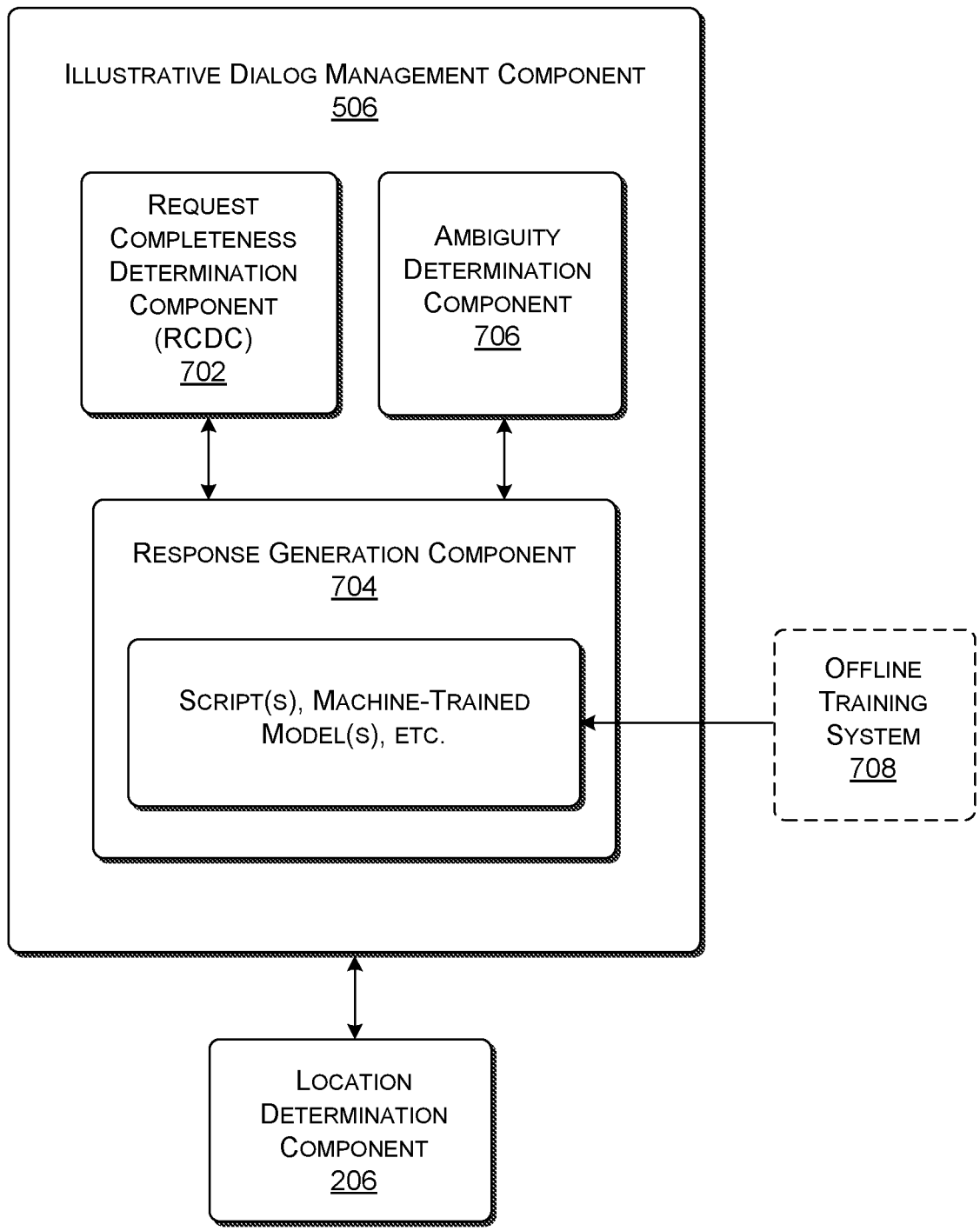
FIG. 7 shows one implementation of a dialog management component, for use in the dialog system of FIG. 5.

FIG. 7 shows one implementation of the dialog management component 506 introduced in the context of FIG. 6. The dialog management component 506 tracks the state of an ongoing multi-turn conversation between a user and the dialog system 204. The dialog management component 506 also maps an interpreted request to a PDA utterance.

The dialog management component 506 includes a request completeness determination component (RCDC) 702 that identifies whether a request that a user is making is specified in its full at a current point in time. The RCDC 702 performs this task by determining what task that he user is attempting to perform (which is information conveyed by the intent determination component 604 of the LU component 504). The RCDC 702 then consults predetermined information that specifies what constitutes a complete interpreted request for the identified intent. For instance, assume that the LU component 504 reveals that the user is attempting to obtain a copy of a content item from any source component. In this case, the RCDC 702 determines whether the user has specified at least the name of the desired content item. In another case, assume that the LU component 504 reveals that the user is attempting to transfer a copy of a content item from a first location to a second location. Here, the RCDC determines whether the user has specified at least the name of the desired content item, the first location, and the second location.

Note, however, that a user may specify the input value of any input variable with any level of specificity. For example, a user can specify a retrieval request by a message that reads "Give me a copy of PresentationSalesReport.doc," or by the more general message, "Give me the most recent sales report." The RCDC 702 determines that an input value is received when the user supplies that value with respect to any level of specificity.

Assume that the RCDC 702 deems an interpreted request to be incomplete. In that case, the RCDC 702 instructs a response generation component 704 to solicit additional information from the user. Alternatively, the RCDC 702 deems the interpreted request to be complete, meaning that it determines that all necessary input values have been supplied. In that case, the RCDC 702 instructs the location determination component 206 to begin its search. The location determination component 206 responds by identifying zero, one or more source components that provide a copy of the content item being sought by the user.

An ambiguity determination component 706 identifies whether there is any ambiguity in the output results generated by the location determination component 206. For example, assume that the user inputs the message "Find me a copy the most recent sales report." And assume that the item location determination component 206 finds three different documents having "sales report" in their respective names that were created on the same day. In this case, the ambiguity determination component 706 can instruct the response generation component 704 to resolve the ambiguity, e.g., by asking the user to describe the desired content item with greater detail. For example, the response generation component 704 can formulate a PDA utterance that asks the user whether they intend to find the most recent sales report document from division X of a company or division Y of the company, etc.

The response generation component 704 can use different strategies to map a state of a dialog into a PDA utterance. For example, the response generation component 704 can use a machine-trained statistical model to map input information into the PDA utterance. The input information includes a representation of the interpreted request, a representation of the state of the dialog, and/or other input features. The PDA utterance represents an appropriate response to the input information. In one case, for example, the response generation component 704 can use an encoder-decoder type of recursive neural network (RNN) to perform this mapping. The encoder phase of the RNN maps a representation of the input information into a vector in a semantic space. The decoder phase of the RNN maps the vector into an appropriate PDA utterance. Background information regarding the general topic of encoder-decoder type RNNs can be found, for instance, in Cho et al., "On the Properties of Neural Machine Translation: Encoder-Decoder," arXiv: 1409.1259v2 [cs.CL], October 2014, 9 pages.

An offline (and/or online) training system 708 can generate a machine-trained statistical model for use by the dialog management component 506. The training system 708 can use any approach to perform this task, such as a supervised training approach, a semi-supervised training approach, a reinforcement learning approach, and so on, or any combination thereof.

Alternatively, or in addition, the response generation component 704 can use a rule-based engine to map input information into a PDA utterance. For example, a rule-based engine can identify input information that defines a current state within a dialog flow. The rule-based engine can then consult a predetermined script to determine what PDA utterance should be generated at this stage, if any.

Finally, note that FIGS. 5, 6 and 7 illustrate an implementation of the dialog system 204 that uses plural discrete analysis components, e.g., corresponding to plural discrete machine-trained statistical models. Other implementations can integrate two or more of these separate analysis components into a single analysis component. For example, another implementation can provide a single machine-trained statistical LU model that performs the task of the domain determination component 602, the intent determination component 604, and the slot value determination component 606. Another implementation merges aspects of the LU component 504 with the dialog management component 506, and so on.

B. Illustrative Processes

FIGS. 8-12 show processes that explain the operation of the system 102 of Section A in flowchart form. Since the principles underlying the operation of the system 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

Figure 8:
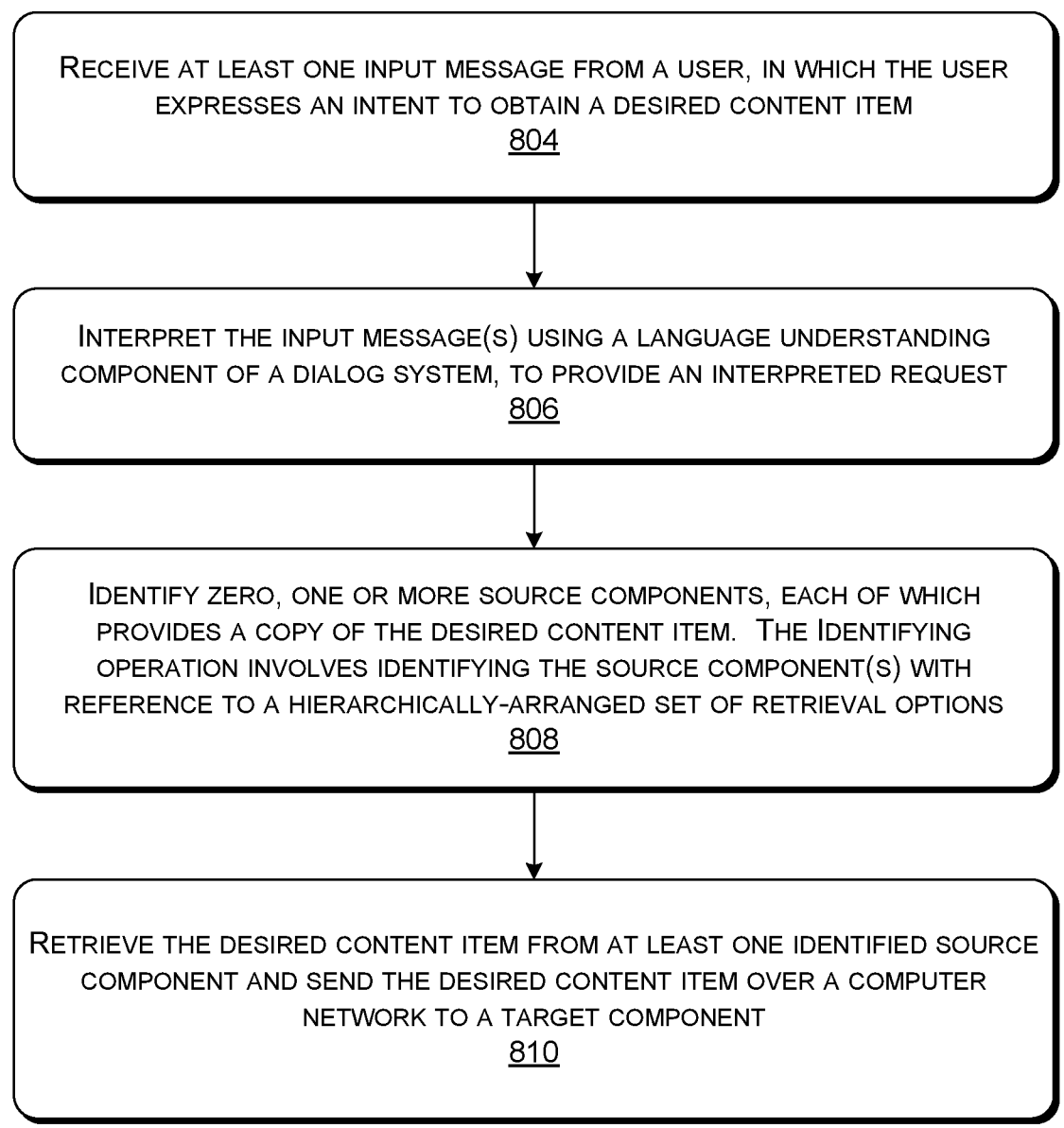
FIG. 8 shows a process that describes an overview of one manner of operation of the system of FIG. 1.

FIG. 8 shows a process 802 that describes an overview of one manner of operation of the system 102 of FIG. 1. In block 804, the PDA functionality 202 receives at least one input message from a user, in which the user expresses an intention to obtain a desired content item. In block 806, the PDA functionality 202 interprets the input message(s) using the language understanding component 504 of the dialog system 204, to provide an interpreted request. In block 808, the PDA functionality 202 identifies zero, one or more source components, each of which provides a copy of the desired content item. The identifying operation involves identifying the component(s) with reference to a hierarchically-arranged set of retrieval options. In block 810, the PDA functionality 202 retrieves the desired content item from at least one identified source component and sends the desired content item over the computer network 118 to a target component. The target component may correspond to the user computing device with which the user is interacting to submit his or her input message(s).

Figure 9:
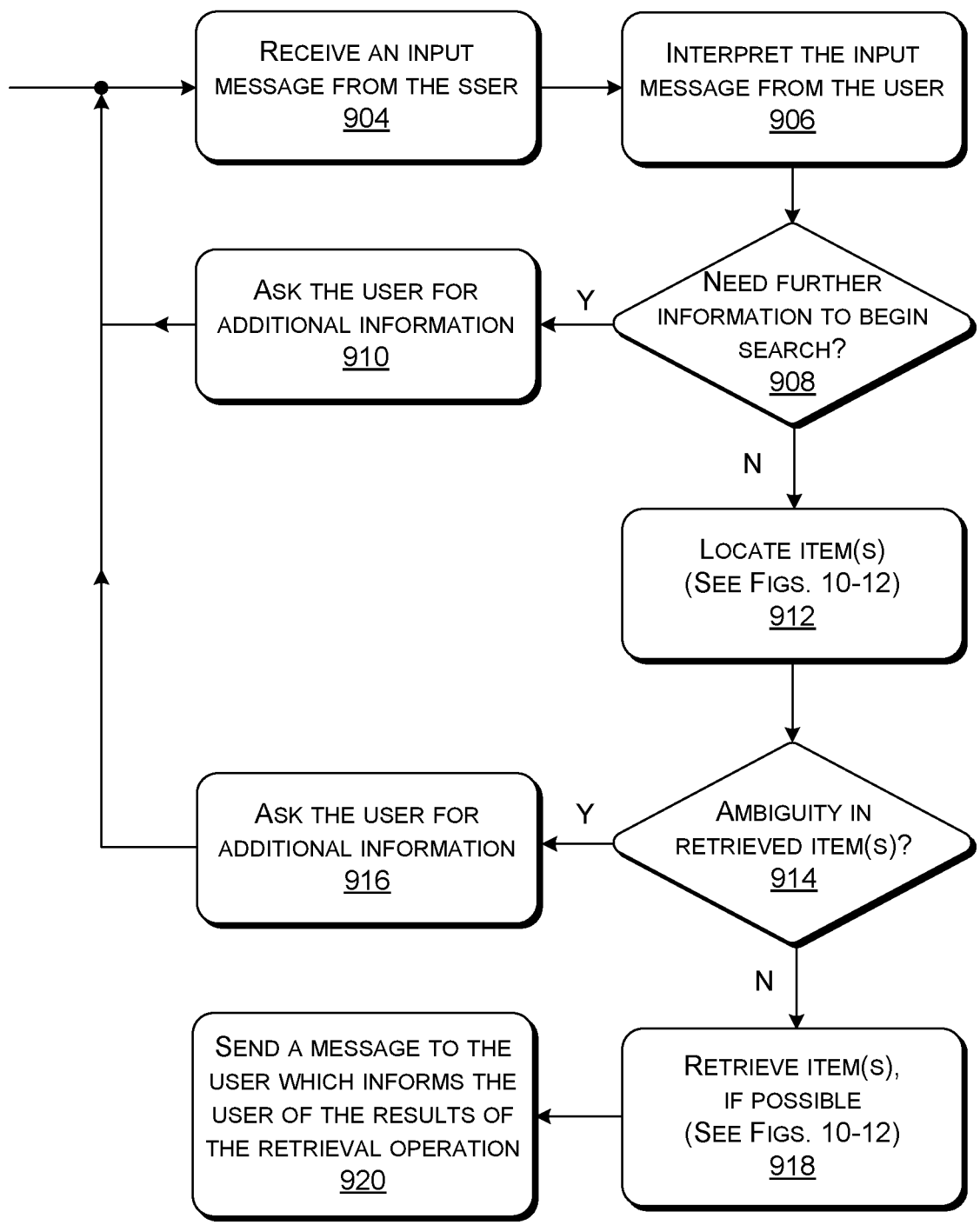
FIG. 9 shows a process that represents one particular implementation of the process of FIG. 8.

FIG. 9 shows a process 902 that represents one particular implementation of the process of FIG. 8. In block 904, the PDA functionality 202 receives an input message from a user. The input message expresses an intention to obtain a copy of a specified content item. In block 906, the PDA functionality 202 interprets the input message using its language understanding component 504, to provide an interpreted request. In block 908, the PDA functionality 202 (using its request completeness determination component 702) determines whether the interpreted request is complete or not. In block 910, the PDA functionality 202 solicits an additional input message from the user if the interpreted request is deemed incomplete.

When the interpreted request is deemed complete, in block 912, the PDA functionality 202 (using its location determination component 206) attempts to find one or more source components that provide a copy of the desired content item. The PDA functionality 202 can use the escalation logic 208 described in FIGS. 11 and 12 (below) to perform this task.

In block 914, the PDA functionality 202 (using its ambiguity determination component 706) determines whether there is any ambiguity in the output results generated in block 912. If so, in block 916, the PDA functionality 202 solicits clarifying information from the user.

In block 918, the PDA functionality 202 (using its item retrieval component 210) retrieves at least one copy of the desired content item from at least one identified source component. In block 920, the PDA functionality 202 sends a message to the user which informs the user of the results of the retrieval operation. For instance, the PDA functionality 202 can inform the user that the content item has been retrieved and sent to the user's computing device. Or the PDA functionality 202 can inform the user that the desired content item can be found in a shared store (e.g., the shared data store 130) at a specified link. Or the PDA functionality 202 can inform the user that the desired content item could not be found.

Figure 10:
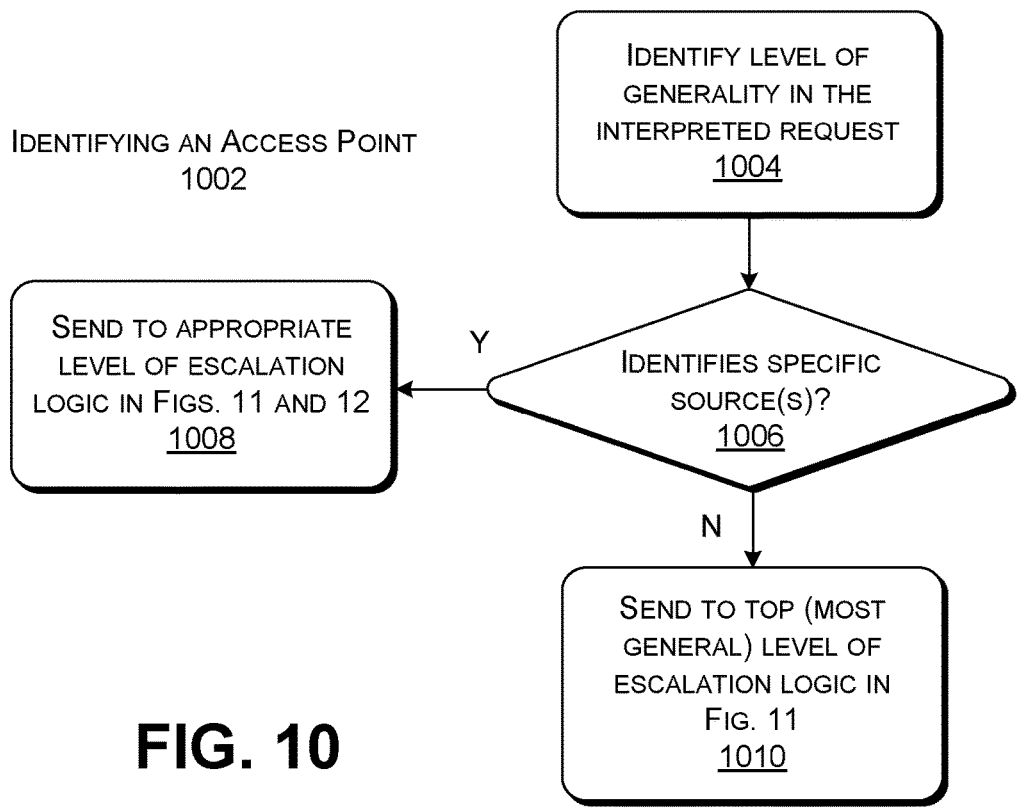
FIG. 10 shows a process for identifying an access point at which a search operation is to commence, with respect a set of hierarchically-arranged retrieval options.

FIG. 10 shows a process 1002 by which the PDA functionality 202 identifies an access point at which a search is to commence, within a hierarchically-arranged set of retrieval options (described in FIGS. 11 and 12). In blocks 1004 and 1006, the location determination component 206 identifies a level of generality associated with an interpreted request. That is, a user can express a retrieval request with different levels of detail. In a first case, the user can express an intent to retrieve a particular content item, without specifying the location at which the content item should be retrieved. In a second case, the user can express both an intent to retrieve the content item and the location (or locations) at which it may be found. Blocks 1004 and 1006 discriminate among at least the two above categories of request specificity.

In block 1008, when the user specifies a desire to obtain the content item from a specific location (or locations), the PDA functionality 202 sends the interpreted request to an appropriate level within a hierarchically-arranged set of retrieval options. That is, the targeted level of the hierarchically-arranged set of retrieval options is configured to search the designated location(s) for the desired content item. In block 1010, when the user expresses an intent to obtain the content item from any location, the PDA functionality 202 sends the interpreted request to the topmost level (or otherwise the most general level) of the hierarchically-arranged set of retrieval options.

FIGS. 11 and 12 together show a process 1102 that represents a staggered search, in which the PDA functionality 202 explores a set of hierarchically-arranged retrieval options. Generally, the location determination component 206 performs the decision blocks of the process 1102, while the item retrieval component 210 performs the actions in the rightmost column of the process 1102. Further note that FIGS. 11 and 12 show a specific set of retrieval options that the PDA functionality 202 explores in a particular order. But other implementations can include a different set of retrieval options and/or can explore the retrieval options in a different order than is specified in FIGS. 11 and 12. To facilitate explanation, FIGS. 11 and 12 are described with respect to the example in which the user X requests a desired content item via the local user computing device 104.

In block 1104, the PDA functionality 202 determines whether the desired content item is present in the local data store 124 of the user computing device 104 with which the user X is currently interacting. If so, in block 1106, the PDA functionality 202 can obtain the content item from the local data store 124.

In block 1108, the PDA functionality 202 determines whether the desired content item can be obtained from any other user computing devices 106 associated with the user, where those user computing devices are presently operating in an active (powered-on) state. If so, in block 1110, the PDA functionality obtains the desired content item the data store(s) of at least one of these active-state user computing devices.

In block 1202, the PDA functionality 202 determines whether the desired content item can be obtained from any other user computing devices 106 associated with the user, where those user computing devices are presently operating in a powered-off or low-power (e.g., sleep) state. If so, in block 1204, the PDA functionality 202 turns on at least one selected user computing device and obtains the desired content item from its data store. A wakeup component (shown in FIG. 13, described below) can turn on a user computing device upon receiving a wakeup message from the PDA functionality 202.

In block 1206, the PDA functionality 202 determines whether: (a) the desired content item has been shared with another user; and (b) the content item remains available in a shared data store. If so, in block 1208, the PDA functionality 202 obtains a copy of the content item from the shared data store.

In block 1210, the PDA functionality 202 determines whether the desired content item is available on a user computing device associated with an inner circle user. In one implementation, the PDA functionality 202 can make this determination because it has fully visibility as to the contents of each user computing device of each inner circle contact. If block 1210 is answered in the affirmative, in block 1212, the PDA functionality 202 obtains a copy of the content item from an inner circle contact's user computing device. Although not shown, the PDA functionality 202 can first attempt to retrieve the desired content item from an inner circle user computing device that is currently operating in an active powered-on state. If the content item cannot be found on an active user computing device, the PDA functionality 202 can attempt to obtain it from an inner circle user computing device operating in a powered-off or low-power (e.g., sleep) state.

In block 1214, the PDA functionality 202 determines whether the desired content item has been shared with a user in the past (where that user need not correspond to an inner circle contact). If so, in block 1216, the PDA functionality 202 can send that user a message which invites that user to send the desired content item to the user. Note that, if the user is not an inner circle contact, the PDA functionality 202 will not have advance knowledge that the user actually has a copy of the desired content item.

The PDA functionality 202 can send the message to the user via a counterpart local PDA component associated with the contact. The contact can respond to the message by either providing the desired content item or declining to provide the content item. If the user declines, the PDA functionality 202 can simply indicate that the content item could not be found, without revealing that the user refused to provide the contact item; this manner of operation helps preserve the privacy of the user. Moreover, any user can disable these kinds of cross-PDA messages in wholesale fashion or with respect to certain message-sending users.

In block 1218, the PDA functionality 202 determines whether there is a person that the user trusts to obtain a desired content item from one of the user's own user computing devices. The PDA functionality 202 can make this determination by consulting a preconfigured list of such entrusted individuals. In block 1220, the PDA functionality 202 sends a message to one or more of these individuals, asking them for help in retrieving the desired contact item on behalf of the user.

C. Representative Computing Functionality

Figure 13:
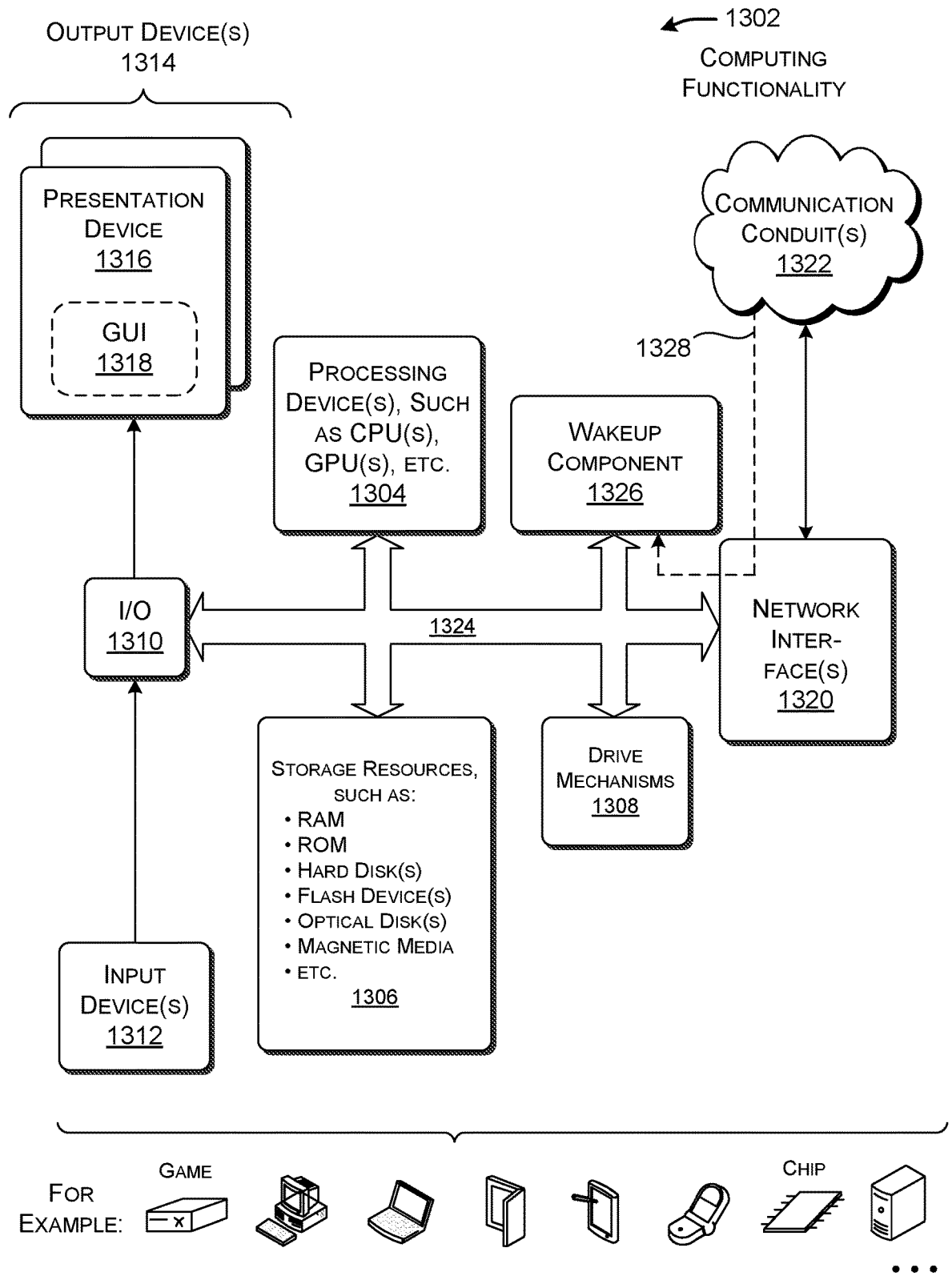
FIG. 13 shows illustrative computing functionality that can be used to implement any aspect of the features shown in the foregoing drawings.

FIG. 13 shows computing functionality 1302 that can be used to implement any aspect of the mechanisms set forth in the above-described figures. For instance, the type of computing functionality 1302 shown in FIG. 13 can be used to implement any local user computing device shown in FIG. 1 (such as the local user computing device 104), a remote server computing device (such as a remote server computing device used to implement the remote PDA component 122), etc. In all cases, the computing functionality 1302 represents one or more physical and tangible processing mechanisms.

The computing functionality 1302 can include one or more hardware processor devices 1304, such as one or more central processing units (CPUs), and/or one or more graphics processing units (GPUs), and so on. The computing functionality 1302 can also include any storage resources (also referred to as computer-readable storage media or computer-readable storage medium devices) 1306 for storing any kind of information, such as machine-readable instructions, settings, data, etc. Without limitation, for instance, the storage resources 1306 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1302. The computing functionality 1302 may perform any of the functions described above when the hardware processor device(s) 1304 carry out computer-readable instructions stored in any storage resource or combination of storage resources. For instance, the computing functionality 1302 may carry out computer-readable instructions to perform each block of the processes described in Section B. The computing functionality 1302 also includes one or more drive mechanisms 1308 for interacting with any storage resource, such as a hard disk drive mechanism, an optical disk drive mechanism, and so on.

The computing functionality 1302 also includes an input/output component 1310 for receiving various inputs (via input devices 1312), and for providing various outputs (via output devices 1314). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1316 and an associated graphical user interface presentation (GUI) 1318. The display device 1316 may correspond to a charge-coupled display device, a cathode ray tube device, a projection mechanism, etc. Other output devices include a printer, one or more speakers, a haptic output mechanism, an archival mechanism (for storing output information), and so on. The computing functionality 1302 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area computer network, a wide area computer network (e.g., the Internet), point-to-point connections, etc., or any combination thereof. The communication conduit(s) 1322 can include any combination of hardwired links, wireless links, routers, gateway functionality, name servers, etc., governed by any protocol or combination of protocols.

A wakeup component 1326 operates in a low-power state when the computer functionality is otherwise in a powered-off or low-power (e.g., sleep) state. The wakeup component receives a wakeup message 1328 over the communication conduit(s) 1322 from the PDA functionality 202. In response, the wakeup component 1326 restores the computing functionality 1302 to an active (powered-on) state. The wakeup component 1326 can use different protocols to perform its task. In one case, the wakeup component 1326 communicates with the PDA functionally 202 that sends the wakeup message 1328 over a virtual private network (VPN).

In another implementation, the wakeup component 1326 periodically sends a polling signal to the remote PDA component 122 and/or to some other companion wakeup service. To send this polling signal, the wakeup component 1326 instructs the computing functionality 1302 to temporarily operate in an increased-power state, relative to its powered-off or sleep state. In response to the polling signal, the remote PDA component 122 determines whether there is work for the computing functionality 1302 to perform. If so, the remote PDA component 122 sends the wakeup message 1328 to the computing functionality 1302, which prompts the wakeup component 1326 to restore the computing functionality 1302 to an active (power-on) state.

Alternatively, or in addition, any of the functions described in the preceding sections can be performed, at least in part, by one or more hardware logic components. For example, without limitation, the computing functionality 1302 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, one or more computing devices for implementing personal digital assistant (PDA) functionality is described herein. The computer device(s) includes a dialog system configured to interact with a user via a conversational user interface. The dialog system is configured to: receive at least one input message from the user, in which the user expresses an intent to obtain a desired content item; and interpret the above-referenced at least one input message using a language understanding component, to provide an interpreted request. The device(s) also includes a location determination component configured to identify zero, one or more source components, each of which provides a copy of the desired content item. The location determination component includes escalation logic for identifying the above-referenced zero, one or more source components based on a hierarchically-arranged set of retrieval options. The device(s) also includes an item retrieval component configured to retrieve the desired content item from at least one identified source component and to send the desired content item over a computer network to a target component.

According to a second aspect, the user submits the above-referenced at least one input message via a first user computing device associated with the user. Further, one or more of the above-referenced zero, one or more source components includes another user computing device associated with the user.

According to a third aspect, the target component corresponds to the first user computing device.

According to a fourth aspect, the target component alternatively corresponds to a user computing device other than the first user computing device.

According to a fifth aspect, the user submits the above-referenced at least one input message via a first user computing device associated with the user. Further, at least part of the dialog system, location determination component, and item retrieval component is implemented by at least one server computing device with which the first user computing device is communicatively coupled via the computer network.

According to a sixth aspect, the dialog system is configured to solicit one or more of the above-referenced at least one input message to generate an interpreted request that is complete. An interpreted request is complete when values have been received for all input variables associated with the interpreted request.

According to a seventh aspect, the device(s) also includes an indexing component that is configured to compile master index information based on individual index information provided by each of a collection of candidate source components. The master index information provides metadata that identifies content items stored on each of the collection of candidate source components. Further, the location determination component is configured to identify the above-referenced zero, one or more source components by consulting the master index information.

According to an eighth aspect, the indexing component is configured, at least in part, to generate the master index information as a backend task, prior to receipt of the above-referenced at least one input message.

According to a ninth aspect, the indexing component is configured, at least in part, to generate the master index information in an on-demand manner in response to receipt of the above-referenced at least one input message.

According to a tenth aspect, the hierarchically-arranged set of retrieval options includes: a first option that seeks to retrieve the desired content item from a local store associated with a first user computing device to which the user has immediate access; and a second option that seeks to retrieve the desired content item from another computing device controlled by the user, besides the first user computing device, that is currently in an active powered-on state.

According to an eleventh aspect, the hierarchically-arranged set of retrieval options further includes: another option that seeks to retrieve the desired content item from another user computing device controlled by the user, besides the first user computing device, that is currently in an inactive powered-off state or a sleep state. That other option involves restoring the other user computing device that is currently in an inactive powered-off state or a sleep state to an active powered-on state.

According to a twelfth aspect, the hierarchically-arranged set of retrieval options further includes: another option that seeks to retrieve the desired content item from a data store that contains the desired content item as a result of the user sharing the desired content item with another user.

According to a thirteenth aspect, the user issuing the above-referenced at least one input message corresponds to a first user. The hierarchically-arranged set of retrieval options further includes another option that seeks to retrieve the desired content item from a user computing device associated with a second user, the second user being identified as having a privileged relationship with the first user, enabling the first user to identify and obtain content items that are stored on user computing devices controlled by the second user.

According to a fourteenth aspect, the user issuing the above-referenced at least one input message corresponds to a first user. The hierarchically-arranged set of retrieval options further includes another option that involves sending a message to a second user, who is a contact of the first user, wherein that message invites the second user to provide the desired content item.

According to a fifteenth aspect, with respect to the fourteenth aspect, upon the second user declining to provide the desired content item, the dialog system is configured to inform the first user that the desired item cannot be obtained, without specifically revealing that the second user has declined to provide the desired content item.

According to a sixteenth aspect, with respect to the fourteenth aspect, the second user is chosen in response to stored information that indicates that the second user has had access to the desired content item.

According to a seventeenth aspect, with respect to the fourteenth aspect, the second user is alternatively chosen in response to stored information that indicates that the second user has access to at least one user computing device associated with the first user.

According to an eighteenth aspect, the location determination component is configured to access a stage in the hierarchically-arranged set of retrieval options based on an assessed level of generality of the interpreted request.

According to a nineteenth aspect, a method is described, implemented by one or more computing devices, for retrieving a desired content item. The method includes: receiving at least one input message from a user, in which the user expresses an intent to obtain a desired content item; interpreting the above-referenced at least one input message using a language understanding component of a dialog system, to provide an interpreted request; and identifying zero, one or more source components, each of which provides a copy of the desired content item. The above-referenced identifying operation involves identifying the above-referenced zero, one or more source components with reference to a hierarchically-arranged set of retrieval options. Further, the above-referenced identifying operation further involves accessing a stage in the hierarchically-arranged set of retrieval options based on an assessed level of generality of the interpreted request. The method also includes retrieving the desired content item from at least one identified source component and sending the desired content item over a computer network to a target component.

According to a twentieth aspect, a computer-readable storage medium for storing computer-readable instructions is described. The computer-readable instructions, when executed by one or more processor devices, perform a method that includes: receiving at least one input message from a first user, in which the first user expresses an intent to obtain a desired content item; interpreting the above-referenced at least one input message using a language understanding component of a dialog system, to provide an interpreted request; and identifying zero, one or more source components, each of which provides a copy of the desired content item. The identifying operation involves identifying the above-referenced zero, one or more source components with reference to a hierarchically-arranged set of retrieval options. The method further includes retrieving the desired content item from at least one identified source component and sending the desired content item over a computer network to a target component. The hierarchically-arranged set of retrieval options includes: a first option that seeks to retrieve the desired content item from a local store associated with a first user computing device to which the first user has immediate access; a second option that seeks to retrieve the desired content item from another user computing device controlled the first user, besides the first user computing device; and a third option that seeks to retrieve the desired content item from a user computing device controlled by a second user, the second user being a contact of the first user.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for implementing personal digital assistant (PDA) functionality, comprising:
a dialog system configured to interact with a user via a conversational user interface, the dialog system being configured to:
receive at least one input message from the user, in which the user expresses an intent to obtain a desired content item; and
interpret said at least one input message using a language understanding component, to provide an interpreted request;
a location determination component configured to identify one or more source components, each of which provides a copy of the desired content item,
the location determination component including escalation logic for identifying said one or more source components by exploring a ranked set of respective retrieval options implemented by plural respective decision blocks,
wherein the location determination component is configured to:
identify an access point in the ranked set of retrieval options based on an assessed level of generality of the interpreted request, the access point being a highest-ranked retrieval option in the set of retrieval options for a first case in which the interpreted request does not specify a particular retrieval option, the access point being the particular retrieval option for a second case in which the interpreted request specifies the particular retrieval option; and
commence a search for said one or more source components starting at the access point; and
an item retrieval component configured to, in response to the search, retrieve the desired content item from at least one identified source component and to send the desired content item to a target component.

2. The one or more computing devices of claim 1, wherein the user submits said at least one input message via a first user computing device associated with the user, and wherein one or more of said one or more source components includes another user computing device associated with the user.

3. The one or more computing devices of claim 2, wherein the target component corresponds to the first user computing device.

4. The one or more computing devices of claim 2, wherein the target component corresponds to a user computing device other than the first user computing device.

5. The one or more computing devices of claim 1,
wherein the dialog system is configured to solicit one or more of said at least one input message to generate the interpreted request, the interpreted request being complete,
the interpreted request being complete when values have been received for all input variables associated with the interpreted request.

6. The one or more computing devices of claim 1,
further including an indexing component that is configured to compile master index information based on individual index information provided by each of a collection of candidate source components,
wherein the master index information provides metadata that identifies content items that have been stored by users on each of the collection of candidate source components, and
wherein the location determination component is configured to identify said one or more source components by consulting the master index information.

7. The one or more computing devices of claim 1, wherein the ranked set of retrieval options includes:
a first option that seeks to retrieve the desired content item from a local store associated with a first user computing device with which the user is currently interacting; and
a second option that seeks to retrieve the desired content item from another user computing device controlled by the user, besides the first user computing device, the other user computing device being currently in an active powered-on state.

8. The one or more computing devices of claim 7, wherein the ranked set of retrieval options further includes:
another option that seeks to retrieve the desired content item from yet another user computing device controlled by the user, besides the first user computing device, the yet other user computing device being in an inactive powered-off state or a sleep state,
the other option involving restoring the yet other user computing device that is currently in an inactive powered-off state or a sleep state to an active powered-on state.

9. The one or more computing devices of claim 7, wherein the ranked set of retrieval options further includes:
another option that seeks to retrieve the desired content item from a data store, the desired content item being placed in the data store as a result of the user sharing the desired content item with another user.

10. The one or more computing devices of claim 7, wherein the user issuing said at least one input message corresponds to a first user, and wherein the ranked set of retrieval options further includes:
another option that seeks to retrieve the desired content item from a user computing device associated with a second user,
the second user being identified as having a privileged relationship with the first user, enabling the first user to identify and obtain content items that are stored on user computing devices controlled by the second user.

11. The one or more computing devices of claim 7, wherein the user issuing said at least one input message corresponds to a first user, and wherein the ranked set of retrieval options further includes:
another option that involves sending a message to a second user, who is a contact of the first user, wherein the message sent to the second user invites the second user to provide the desired content item.

12. The one or more computing devices of claim 11, wherein, upon the second user declining to provide the desired content item, the dialog system is configured to inform the first user that the desired item cannot be obtained, without revealing that the second user has declined to provide the desired content item.

13. The one or more computing devices of claim 11, wherein the second user is chosen in response to stored information that indicates that the second user has had access to the desired content item.

14. The one or more computing devices of claim 11, wherein the second user is chosen in response to stored information that indicates that the second user has access to at least one user computing device associated with the first user.

15. A method, implemented by one or more computing devices, for retrieving a desired content item, comprising:
receiving at least one input message from a user, in which the user expresses an intent to obtain the desired content item;
interpreting said at least one input message using a language understanding component of a dialog system, to provide an interpreted request;
identifying one or more source components, each of which provides a copy of the desired content item,
said identifying involving identifying said one or more source components with reference to a ranked set of retrieval options associated with respective decision blocks of escalation logic,
said identifying further involving identifying an access point in the ranked set of retrieval options based on an assessed level of generality of the interpreted request, the access point being a highest-ranked retrieval option in the set of retrieval options for a first case in which the interpreted request does not specify a particular retrieval option, the access point being the particular retrieval option for a second case in which the interpreted request specifies the particular retrieval option;
commencing a search for said one or more source components from the access point,
the method encompassing a case in which said commencing results in not performing at least one retrieval option in the set of retrieval options; and
in response to the search, retrieving the desired content item from at least one identified source component and sending the desired content item to a target component.

16. A computer-readable storage medium for storing computer-readable instructions, the computer-readable instructions, when executed by one or more processor devices, performing a method that comprises:
receiving at least one input message from a first user, in which the first user expresses an intent to obtain a desired content item;
interpreting said at least one input message using a language understanding component of a dialog system, to provide an interpreted request;
identifying one or more source components, each of which provides a copy of the desired content item,
said identifying involving identifying said one or more source components with reference to a ranked set of retrieval options associated with respective decision blocks provided by escalation logic; and
retrieving the desired content item from at least one identified source component and sending the desired content item to a target component,
the ranked set of retrieval options including:
a first option that seeks to retrieve the desired content item from a local store associated with a first user computing device with which the first user is currently interacting;
a second option that seeks to retrieve the desired content item from another user computing device controlled the first user, besides the first user computing device; and
a third option that seeks to retrieve the desired content item from a user computing device controlled by a second user, the second user being a contact of the first user,
the computer-readable instructions being configured to commence a search for said one or more search components using the first option when the interpreted request does not specify a particular retrieval option, commence the search using the second option when the interpreted request specifies the other user computing device controlled by the first user, and commence the search using the third option when the interpreted request specifies the user computing device controlled by the second user.

17. The one or more computing devices of claim 1, wherein the escalation logic is configured to explore the retrieval options in a particular order.

18. The one or more computing devices of claim 1, wherein the escalation logic explores the set retrieval options in a manner that is based on learned preferences of the user.

19. The one or more computing devices of claim 1, wherein in at least one instance, the second case resulting in not performing at least one retrieval option in the set of retrieval options.

* * * * *